United States Patent
Gopalarathnam et al.

(10) Patent No.: US 10,491,511 B1
(45) Date of Patent: Nov. 26, 2019

(54) FEEDBACK-BASED PACKET ROUTING SYSTEM

(71) Applicant: Dell Products L.P., Round Rock, TX (US)

(72) Inventors: Sudharsan Dhamal Gopalarathnam, Chennai (IN); Karthik Krishnamurthy, Chennai (IN); Avinash Jayakumar, Chennai (IN); Noufal KP, Chennai (IN); Anbalagan Natchimuthu, Chennai (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/041,491

(22) Filed: Jul. 20, 2018

(51) Int. Cl.
*H04L 12/28* (2006.01)
*H04L 12/707* (2013.01)
*H04L 12/721* (2013.01)
*H04L 12/761* (2013.01)
*H04L 12/741* (2013.01)
*H04L 12/26* (2006.01)

(52) U.S. Cl.
CPC .............. *H04L 45/24* (2013.01); *H04L 45/14* (2013.01); *H04L 45/16* (2013.01); *H04L 45/74* (2013.01); *H04L 43/0876* (2013.01)

(58) Field of Classification Search
CPC .................................................................
H04L 12/28; H04L 12/2854; H04L 12/2856; H04L 12/56; H04L 12/5825
USPC .......................................... 370/389, 400, 465
See application file for complete search history.

(56) References Cited

U.S. PATENT DOCUMENTS

| | | | |
|---|---|---|---|
| 7,903,573 B2 * | 3/2011 | Singer | H04L 45/38 370/252 |
| 9,419,908 B2 * | 8/2016 | Kulkarni | H04L 47/27 |
| 9,450,873 B2 * | 9/2016 | Greenberg | H04L 47/12 |
| 10,193,810 B2 * | 1/2019 | Hira | H04L 47/125 |
| 10,193,811 B1 * | 1/2019 | Satyanarayana | H04L 47/127 |
| 10,320,681 B2 * | 6/2019 | Hira | H04L 43/0864 |
| 2015/0127797 A1 * | 5/2015 | Attar | H04L 47/125 709/223 |
| 2016/0065423 A1 * | 3/2016 | Zhang | H04L 43/02 370/235 |

* cited by examiner

*Primary Examiner* — Dmitry Levitan
(74) *Attorney, Agent, or Firm* — Haynes and Boone, LLP

(57) ABSTRACT

A feedback-based ECMP packet routing system includes a first node having a first node ECMP link group with first node ECMP links. The first node provides, in data packets forwarded through the first node ECMP links, first node ECMP feedback tag information including a first node identifier, a first node ECMP link group identifier, and a first node ECMP link identifier identifying the first node ECMP link used to forward the data packet. A second node receives a data packet from the first node via the first node ECMP link, stores its first node ECMP feedback tag information, and forwards the data packet through the second node link to the third node. When the link utilization of the second node link reaches a threshold, the ECMP feedback tag information is used to generate and send a feedback packet that causes the first node to adjust its ECMP routing parameters.

20 Claims, 19 Drawing Sheets ized that conventional systems use. As the value and use of information continues to increase,

FEEDBACK-BASED PACKET ROUTING SYSTEM

BACKGROUND

The present disclosure relates generally to information handling systems, and more particularly to routing packets via networked information handling systems based on feedback.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handlings systems such as, for example, switch devices, router devices, and/or other networking devices, are often used to route packets through a network. One example of a routing strategy used to route packets is the Equal Cost Multi-Path (ECMP) routing strategy, where next-hop packet forwarding to a single destination may occur over multiple "best paths" that are determined according to routing calculations. The ECMP routing strategy is useful with most routing protocols, as each networking device in a path operates to perform the per-hop decision making. However, ECMP techniques used by networking devices to determine which of its ECMP links in its ECMP link group over which to forward a packet are subject to some issues. For example, one method for determining which ECMP link in an ECMP link group over which to forward a packet is via a hashing operation, which is meant to distribute packets randomly over the ECMP links in the ECMP link groups. Another method for determining which ECMP link in an ECMP link group over which to forward a packet is Dynamic Load Balancing, which selects ECMP links in the ECMP link group based on their relative utilization levels. However, such conventional ECMP link selection methods often can lead to non-optimal paths for the packet through the network, as there may be issues in the other networking devices and/or their ECMP link groups downstream that are not considered in the packet forwarding decision being made by any particular networking device.

Accordingly, it would be desirable to provide an improved packet routing system.

SUMMARY

According to one embodiment, an Information Handling System (IHS), comprising: a communication system that is configured to provide a communication system link; a processing system that is coupled to the communication system; and a memory system that is coupled to the processing system and that includes instructions that, when executed by the processing system, cause the processing system to provide an Equal Cost Multi-Path (ECMP) routing and feedback engine that is configured to: receive a data packet from a first node via the a first node ECMP link that is part of a first node ECMP link group included on the first node, wherein the data packet includes first node ECMP feedback tag information including: a first node identifier that identifies the first node; a first node ECMP link group identifier that identifies the first node ECMP link group; and a first node ECMP link identifier that identifies the first node ECMP link through which the data packet was forwarded; store the first node ECMP feedback tag information that is included in the data packet; forward the data packet to a second node through a communication system link provided by the communication system; and determine that a link utilization of the communication system link has reached a threshold and, in response, use the ECMP feedback tag information to generate and send a feedback packet through the first node ECMP link to the first node that is configured to cause the first node to adjust ECMP routing parameters in the first node.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
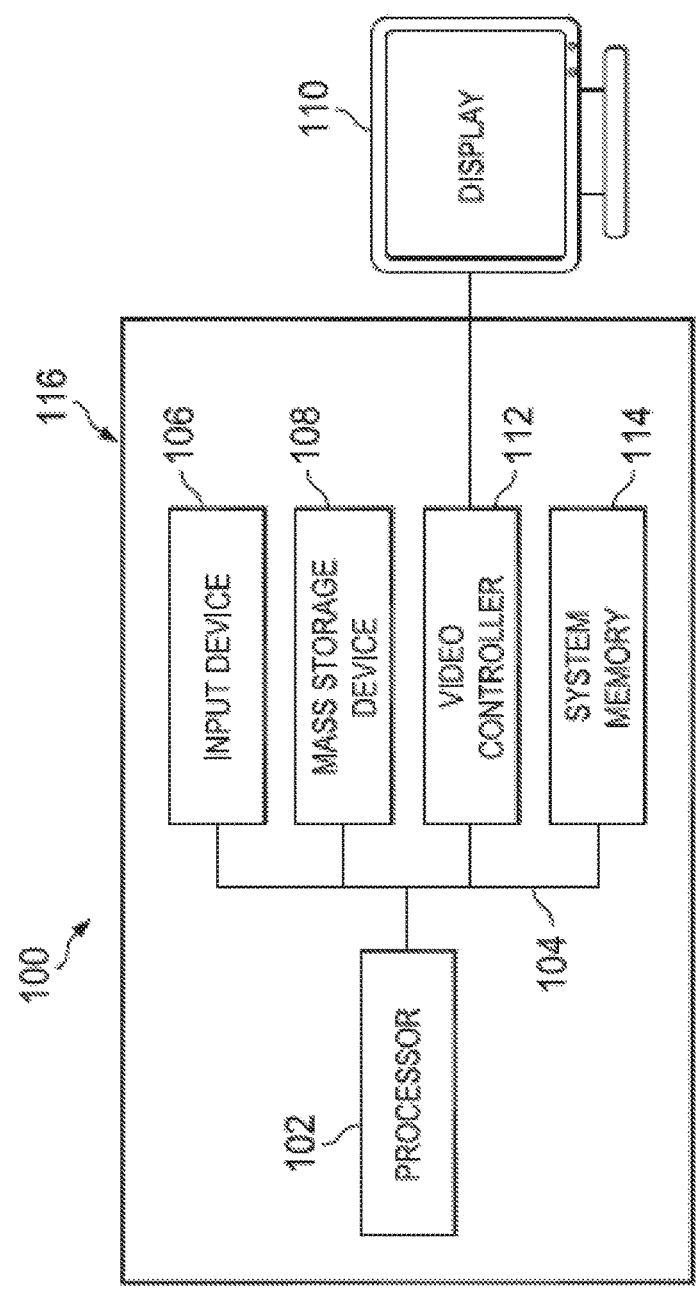
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
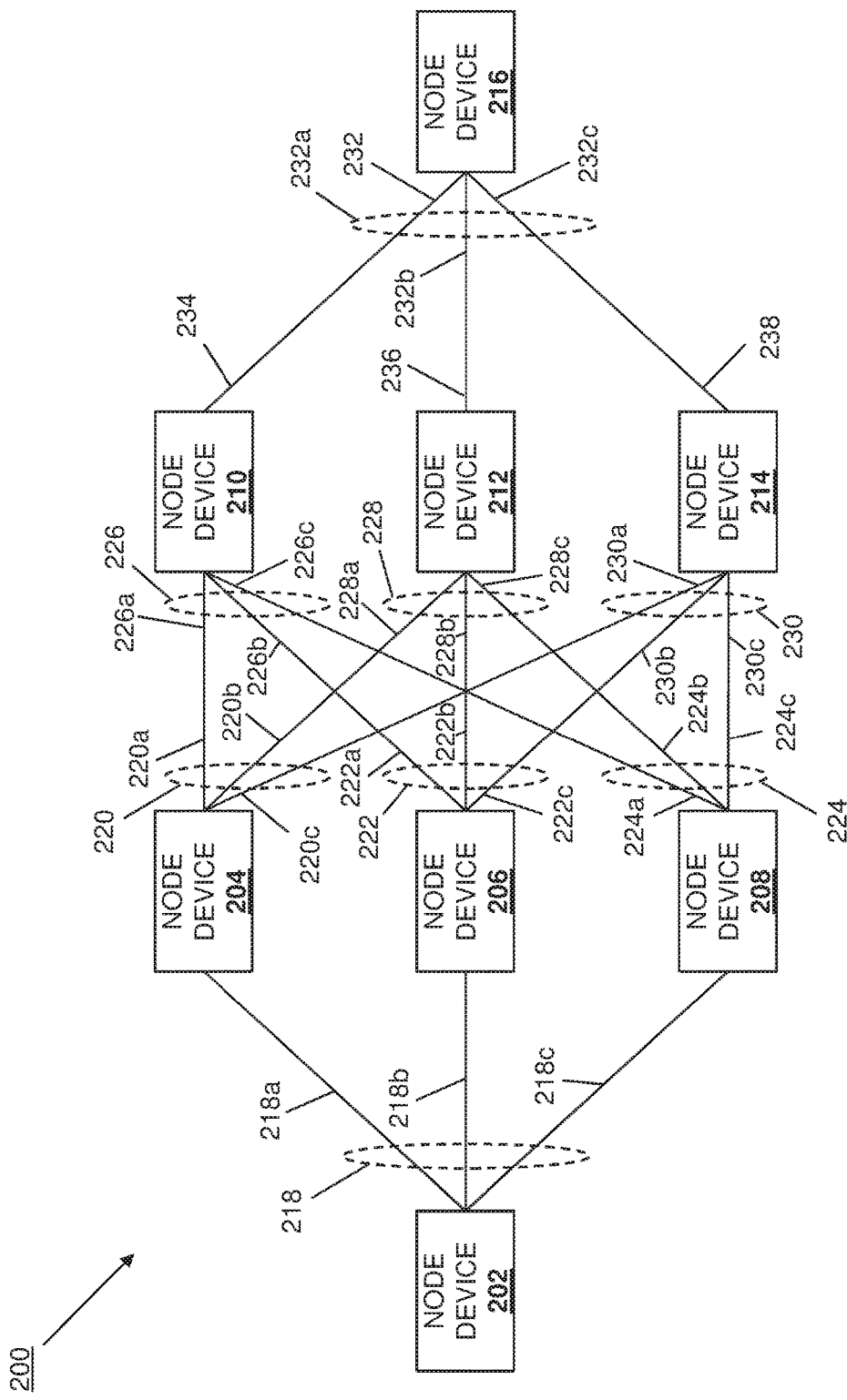
FIG. 2 is a schematic view illustrating an embodiment of a network.

Referring now to FIG. 2, an embodiment of a network 200 in which the feedback-based packet routing system of the present disclosure may be implemented. While in the examples provided below, the feedback-based packet routing system is described as a feedback-based Equal Cost Multi-Path (ECMP) packet routing system, although one of skill in the art in possession of the present disclosure will recognize that packet routing strategies other than ECMP routing strategies may benefit from the teachings of the present disclosure and thus will fall within the scope of the present disclosure as well. In the illustrated embodiment, the network 200 includes a plurality of node devices 202, 204, 206, 208, 210, 212, 214, and 216, any or all of which may be provided switch devices, router devices, and/or a variety of other networking devices that would be apparent to one of skill in the art in possession of the present disclosure. In the specific example illustrated in FIG. 2, the node device 202 includes an ECMP link group 218 having an ECMP link 218*a* to the node device 204, an ECMP link 218*b* to the node device 206, and an ECMP link 218*c* to the node device 208.

Furthermore, as can also be seen in FIG. 2, the node device 204 includes an ECMP link group 220 having an ECMP link 220*a* to the node device 210, an ECMP link 220*b* to the node device 212, and an ECMP link 220*c* to the node device 214; the node device 206 includes an ECMP link group 222 having an ECMP link 222*a* to the node device 210, an ECMP link 222*b* to the node device 212, and an ECMP link 222*c* to the node device 214; the node device 208 includes an ECMP link group 224 having an ECMP link 224*a* to the node device 210, an ECMP link 224*b* to the node device 212, and an ECMP link 224*c* to the node device 214; the node device 210 includes an ECMP link group 226 having an ECMP link 226*a* to the node device 204, an ECMP link 226*b* to the node device 206, and an ECMP link 226*c* to the node device 208; the node device 212 includes an ECMP link group 228 having an ECMP link 228*a* to the node device 204, an ECMP link 228*b* to the node device 206, and an ECMP link 228*c* to the node device 208; the node device 214 includes an ECMP link group 230 having an ECMP link 230*a* to the node device 204, an ECMP link 230*b* to the node device 206, and an ECMP link 230*c* to the node device 208; and the node device 216 includes an ECMP link group 232 having an ECMP link 232*a* to the node device 210, an ECMP link 232*b* to the node device 212, and an ECMP link 232*c* to the node device 214.

In the examples discussed below, a non-ECMP link 234 is provided from the node device 210 to the node device 216, a non-ECMP link 236 is provided from the node device 212 to the node device 216, and a non-ECMP link 238 is provided from the node device 210 to the node device 216. While a specific network 200 of node devices connected via ECMP links/ECMP link groups and/or non-ECMP links has been illustrated and described, one of skill in the art in possession of the present disclosure will recognize that networks may include more or fewer node devices, and/or different node device and/or link configurations, while remaining within the scope of the present disclosure. For example, rather than the ECMP links illustrated and discussed below, other types of links and/or Link Aggregation Groups (LAGs) may be utilized while remaining within the scope of the present disclosure as well.

Figure 3:
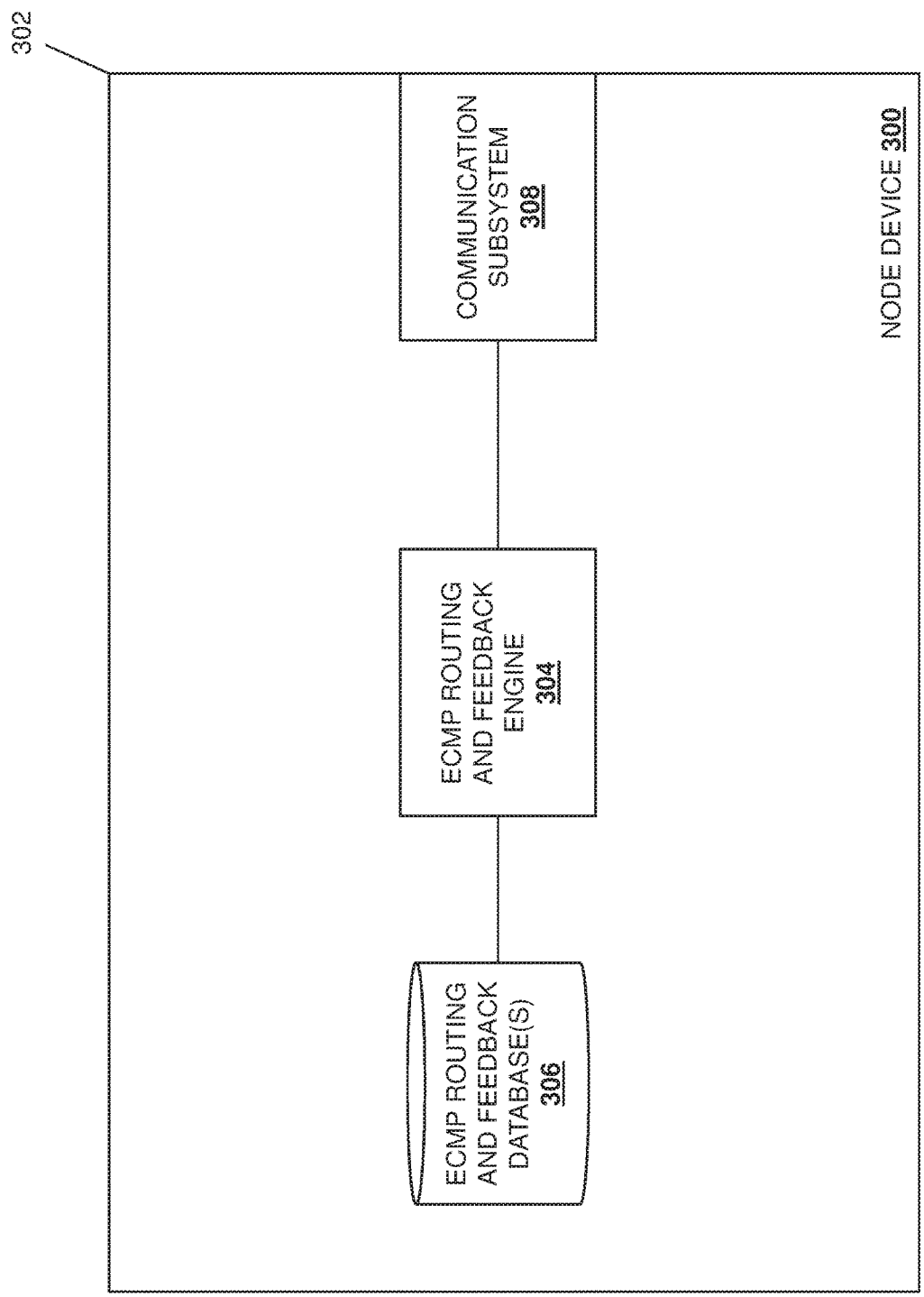
FIG. 3 is a schematic view illustrating an embodiment of a node device that may be provided in the network of FIG. 2.

Referring now to FIG. 3, an embodiment of a node device 300 is illustrated that may be provided for any of the node devices 202-216 discussed above with reference to FIG. 2. As such, the node device 300 may be provided by the IHS 100 discussed above with reference to FIG. 1 and/or may include any or all of the components of the IHS 100, and in specific examples may include a switch device, a router device, and/or other networking devices that would be apparent to one of skill in the art in possession of the present disclosure. In the illustrated embodiment, the node device 300 includes a chassis 302 that houses the components of the node device 300, only some of which are illustrated in FIG.

3. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an ECMP routing and feedback engine 304 that is configured to perform the functions of the ECMP routing and feedback engines and node devices discussed below. In some specific examples, the functionality of the ECMP routing and feedback engine 304 discussed below may be provided by programmable hardware modules such as, for example, hardware module configured to provide the node-to-address table discussed below, the Unique Destination Identifier table discussed below, the ECMP feedback table discussed below, and the feedback packet generation discussed below.

The chassis 302 may also house a storage device (not illustrated, but which may include the storage device 108 discussed above with reference to FIG. 1) that is coupled to the ECMP routing and feedback engine 304 (e.g., via a coupling between the storage device and the processing system) and that includes one or more ECMP routing and feedback databases 306 that are configured to store any of the tables and/or other data discussed below as being utilized by the ECMP routing and feedback engine 304. For example, the ECMP routing and feedback database(s) 306 may store a node-to-address table that maps a globally unique node identifier associated with each node device in the network 200 to a respective Internet Protocol (IP) address for that node device, an embodiment of which is reproduced below:

| GLOBALLY UNIQUE NODE IDENTIFIER | INTERNET PROTOCOL ADDRESS |
|---|---|
| $N_{202}$ | $P_{202}$ |
| $N_{204}$ | $P_{204}$ |
| ... | ... |
| $N_{216}$ | $P_{216}$ |

In another example, the ECMP routing and feedback database(s) 306 may store a Unique Destination Identifier (UDI) table that maps a globally unique utilization identifier associated with each ECMP link or ECMP group (or in some embodiments, Link Aggregation Group (LAG)) to respective utilization statistics, an embodiment of which is reproduced below:

| GLOBALLY UNIQUE UTILIZATION IDENTIFIER | UTILIZATION STATISTICS (%) |
|---|---|
| $U_1$ | $X_1$ |
| $U_2$ | $X_2$ |
| $U_{100}$ | $X_{100}$ |

In another example, the ECMP routing and feedback database(s) 306 may store an egress entity/UDI mapping table that maps UDI discussed above with the actual egress entity for which utilization statistics are being kept, embodiments of which are reproduced below:

| PORT EGRESS ENTITY | UDI |
|---|---|
| $P_1$ | $X_1$ |
| $P_2$ | $X_2$ |
| ... | ... |
| $P_{100}$ | $X_{100}$ |

| ECMP LINK GROUP EGRESS ENTITY | UDI |
|---|---|
| $E_1$ | $X_1$ |
| $E_2$ | $X_2$ |
| ... | ... |
| $E_{100}$ | $X_{100}$ |

| LINK AGGREGATION GROUP EGRESSENTITY | UDI |
|---|---|
| $LAG_1$ | $X_1$ |
| $LAG_2$ | $X_2$ |
| ... | ... |
| $LAG_{100}$ | $X_{100}$ |

In another example, the ECMP routing and feedback database(s) 306 may store an ECMP feedback table that associates ECMP feedback tag information received in data packets with the UDI discussed above, as well as utilization states, an embodiment of which is reproduced below:

| UNIQUE DESTINATION IDENTIFIER | ECMP FEEDBACK TAG INFORMATION | UTILIZATION STATE |
|---|---|---|
| $U_1$ | N204/E220/L220a | GREEN |
| $U_2$ | N206/E222/L222a | GREEN |
| $U_3$ | N208/E224/L22Aa | GREEN |

In the examples below, the utilization state may be provided by a color that corresponds to a utilization threshold (e.g., green corresponding to low utilization, yellow corresponding to medium utilization, red corresponding to high utilization, black corresponding to a link being unavailable, etc.) However, the utilization states provided in the embodiments below are simply meant as an example, and one of skill in the art will recognize that utilization may be identified in a variety of manners that will fall within the scope of the present disclosure as well.

The chassis 302 may also house a communication subsystem 308 that is coupled to the ECMP routing and feedback engine 304 (e.g., via a coupling between the communication subsystem 308 and the processing system) and that may be provided by a Network Interface Controller (NIC), a wireless communication subsystem (e.g., a BLUETOOTH® communication subsystem, a Near Field Communication (NFC) subsystem, etc.), and/or other communication components known in the art. As such, the communication subsystem 308 may include the ports that are utilized to provide the ECMP links that are part of the ECMP link groups (or LAGs) included in the node devices discussed in the examples below. While a specific node device 300 has been illustrated and described, one of skill in the art in possession of the present disclosure will recognize that node devices may include a variety of components and/or component configurations for providing conventional node device functionality, as well as the functionality discussed below, while remaining within the scope of the present disclosure.

Figure 4:
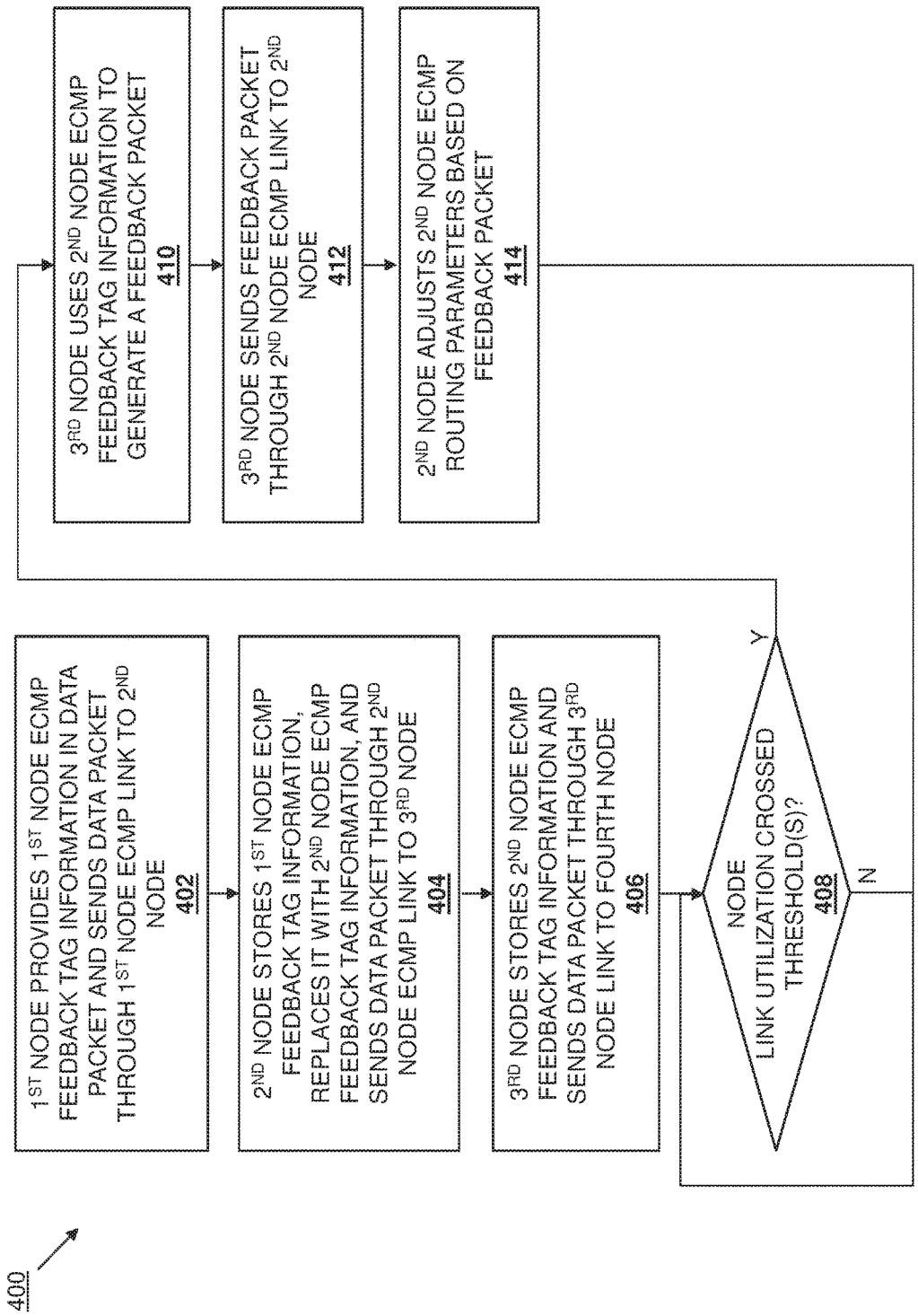
FIG. 4 is a flow chart illustrating an embodiment of a method for providing feedback-based packet routing.

Referring now to FIG. 4, a method 400 for providing feedback-based packet routing is illustrated. As discussed below, embodiments of the systems and methods of the present disclosure provide for ECMP packet routing that takes into account an overall path-based feedback mechanism that allows for the selection of an optimal forwarding node for a new packet flow, or the redistribution of existing packet flows in cases of packet traffic imbalances in a network. For example, the data packets routed through the network by nodes via ECMP packet routing strategies may include (or have added) an ECMP feedback tag that allows any node forwarding that data packet to another node to add ECMP feedback tag information such as a node identifier identifying the node forwarding the data packet, an ECMP link group identifier identifying the ECMP link group used to forward that data packet, and an ECMP link identifier identifying the ECMP link used to forward that data packet. Nodes receiving data packets with ECMP feedback tag information will store that ECMP tag information, and either replace that ECMP feedback tag information with new ECMP feedback tag information if the data packet is forwarded via an ECMP link, or forward the data packet with the ECMP feedback tag information it was received with if the data packet is forwarded via a non-ECMP link. Furthermore, the ECMP feedback information may be learnt on the downstream port through which the ECMP packet egresses (i.e., out of any particular node device.) When any node determines that the utilization of a downstream link has crossed a threshold, it may use the stored ECMP feedback tag information to generate a feedback packet and send that feedback packet upstream to nodes that provided that ECMP feedback tag information. Nodes receiving feedback packets will adjust their ECMP routing parameters (e.g., ECMP link credits) based on the feedback packet, which provides for improved selection of optimal forwarding nodes for new packet flows or existing packet flows.

The method 400 begins at block 402 where a first node provides first node ECMP feedback tag information in a data packet and sends the data packet through a first node ECMP link to a second node. As described below, the ECMP routing and feedback engine 304 in any of the node devices 300 in the network 200 may be configured to provide ECMP feedback tag information in data packets that it forwards through ECMP links to other nodes in the network 200, while also being configured to forward data packets with the ECMP feedback tag information with which they were received when the data packet is forwarded via a non-ECMP link. For example, in an embodiment of block 402, the ECMP routing and feedback engine 304 in the node device 202/300 may receive a data packet (e.g., from a client device, from a server device, and/or from any other device that would be apparent to one of skill in the art in possession of the present disclosure). In an embodiment, the ECMP routing and feedback engine 304 in the node device 202/300 may be configured to add an ECMP feedback tag to data packets that will be forwarded via ECMP links, with that ECMP feedback tag configured to store a node identifier that identifies (to the node receiving that data packet) the node device that forwarded that data packet via an ECMP link, an ECMP link group identifier that identifies (to the node receiving that data packet) the ECMP link group used to forward the data packet, and an ECMP link identifier that identifies (to the node receiving that data packet) the ECMP link used to forward the data packet.

Figure 5A:
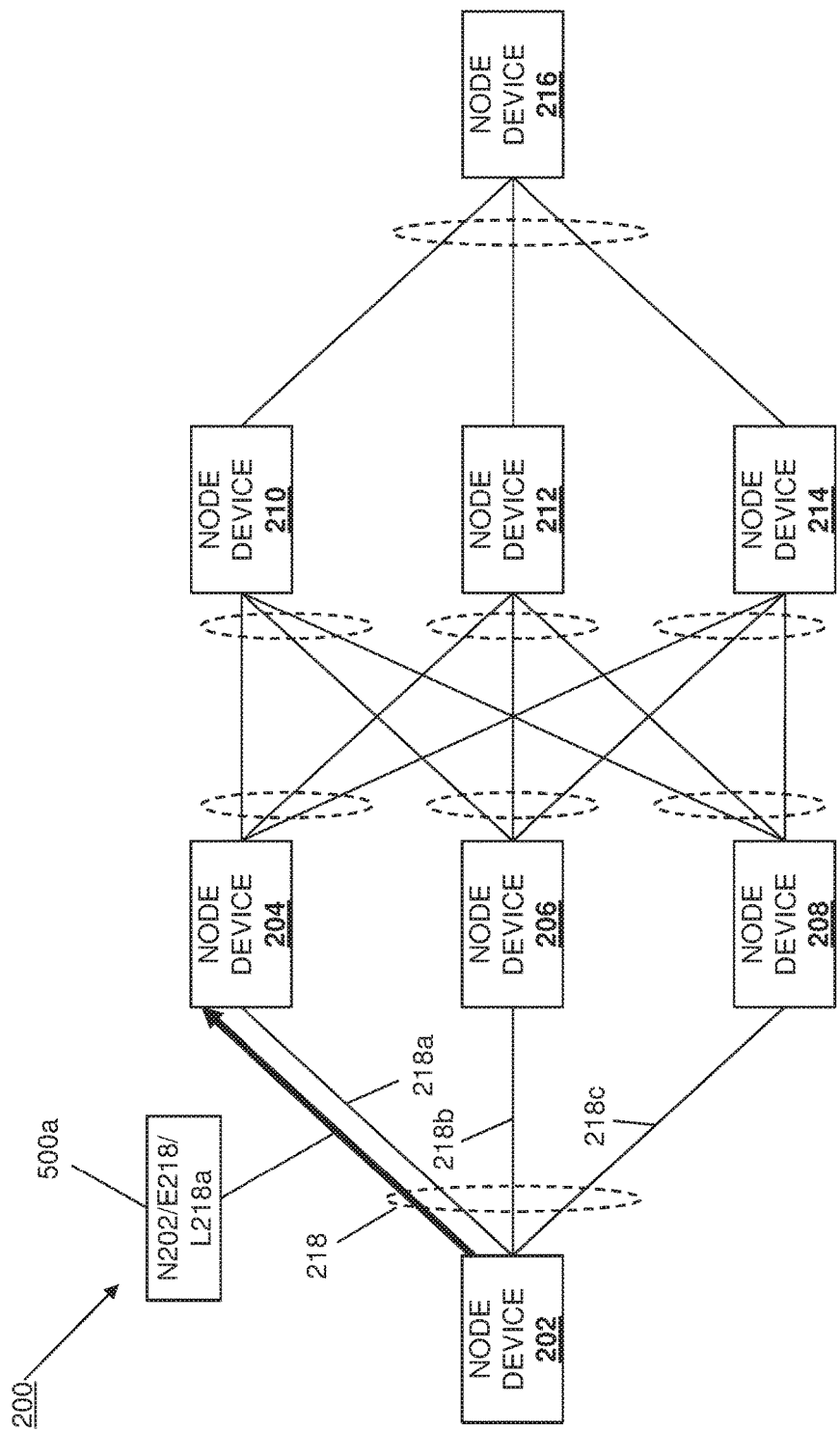
FIG. 5A is a schematic view illustrating an embodiment of the routing of a packet through the network of FIG. 2.

With reference to FIG. 5A, the ECMP routing and feedback engine 304 in the node device 202/300 may determine that the data packet received at block 402 should be forwarded to the node device 204 via the ECMP link 218a/ECMP link group 218 using a variety of conventional ECMP packet routing techniques that would be apparent to one of skill in the art in possession of the present disclosure. For example, the ECMP link 218a may be selected as an "optimal member" or link in the ECMP link group 218, and in some embodiments may be selected based on relative link utilization in the ECMP link group 218. The ECMP routing and feedback engine 304 in the node device 202/300 may then add the ECMP feedback tag to the data packet received at block 402, and provide a node identifier "N202" in the ECMP feedback tag that is globally unique in the network 200 and identifies the node device 202, an ECMP link group identifier "E218" in the ECMP feedback tag that is unique to the node device 202 and identifies the ECMP link group 218, and an ECMP link identifier "L218a" that is unique within the ECMP link group 218 and identifies the ECMP link 218a. However, while the ECMP link identifiers are illustrated and described as identifying "links" (i.e., with an "LXXXx format"), ECMP link identifiers may identify ports (e.g., with a "PXXXx" format) or LAGs while remaining within the scope of the present disclosure as well). As illustrated in FIG. 5A, the ECMP feedback tag information may be appended to data packets (e.g., the data packet 500a, with the ECMP feedback tag information visible in FIG. 5A) that the node device 202 may then forward to the node device 204 via the ECMP link 218a.

The method 400 then proceeds to block 404 where the second node receives the ECMP data packet with the ECMP tag information, determines the ECMP link through which to forward the ECMP data packet, stores the first node ECMP feedback tag information, replaces the first node ECMP feedback tag information with second node ECMP feedback tag information, and sends the packet through a second node ECMP link to a third node. In an embodiment, at block 404, the ECMP routing and feedback engine 304 in the node device 204/300 receives the data packet 500a from the node device 202 and stores the ECMP feedback tag information included therein in its ECMP routing and feedback database(s) 306 such as, for example, in the ECMP feedback table discussed above. As such, in the example provided in FIG. 5A, the ECMP routing and feedback engine 304 in the node device 204/300 may store "N202/E218/L218a" in its ECMP feedback table.

Figure 5B:
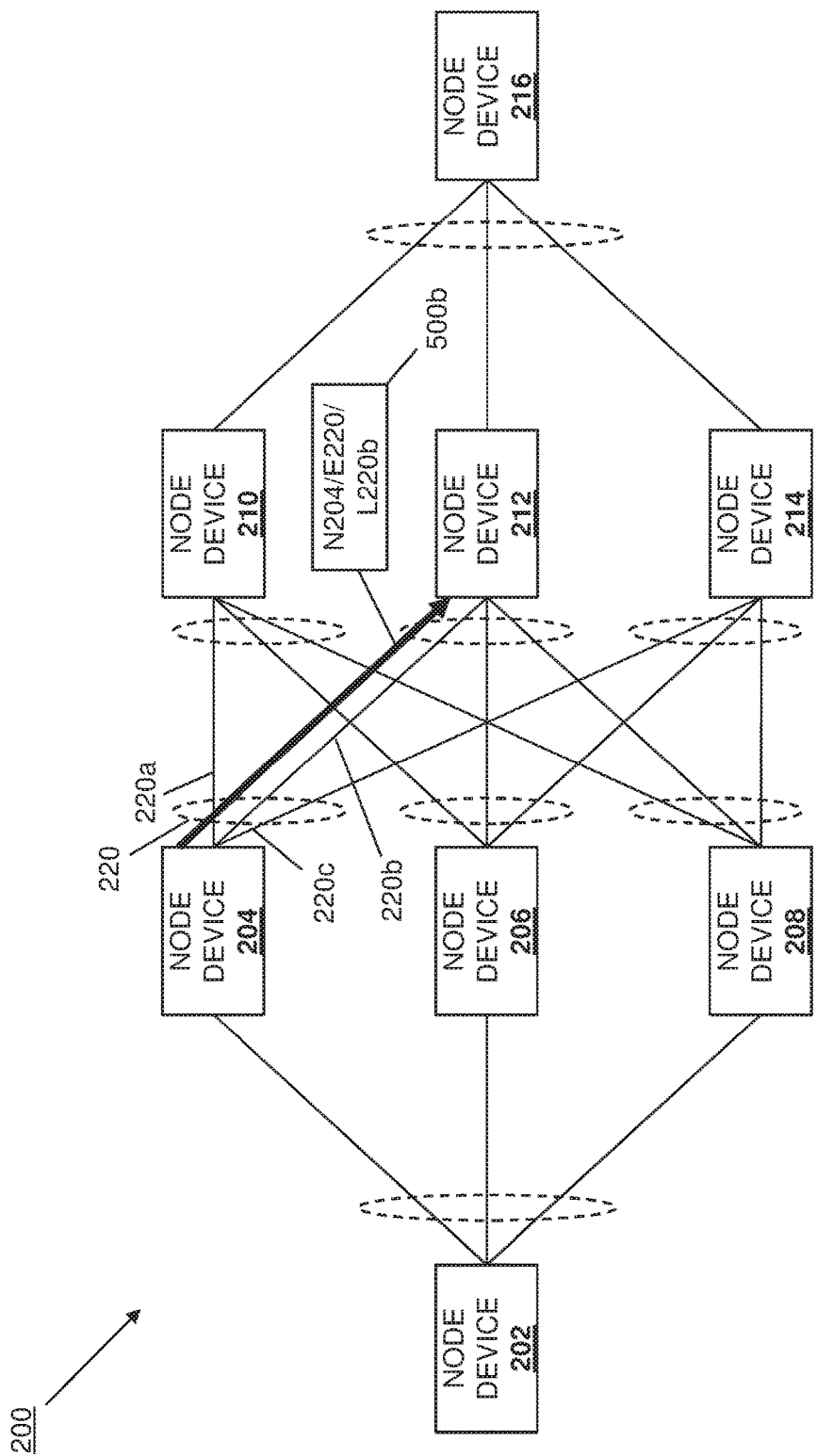
FIG. 5B is a schematic view illustrating an embodiment of the routing of a packet through the network of FIG. 2.

Furthermore, with reference to FIG. 5B, the ECMP routing and feedback engine 304 in the node device 202/300 may determine that the data packet received at block 404 should be forwarded to the node device 204 via the ECMP link 218a/ECMP link group 218 using a variety of conventional ECMP packet routing techniques that would be apparent to one of skill in the art in possession of the present disclosure. The ECMP routing and feedback engine 304 in the node device 204/300 may then replace the ECMP feedback tag information that was received with the data packet ("N202/E218/L218a"), with ECMP feedback tag information that includes a node identifier "N204" in the ECMP feedback tag that is globally unique in the network 200 and identifies the node device 204, an ECMP link group identifier "E220" in the ECMP feedback tag that is unique within the node device 204 and identifies the ECMP link group 220, and an ECMP link identifier "L220b" that is unique within the ECMP link group 220 and identifies the ECMP link 220b. Similarly as discussed above, while the ECMP link identifiers are illustrated and described as identifying "links" (i.e., with an "LXXXx format"), ECMP link identifiers may identify ports (e.g., with a "PXXXx" format) or LAGs while remaining within the scope of the present disclosure as well). As illustrated in FIG. 5B, the replacement of the ECMP feedback tag information (with the ECMP feedback tag information visible in FIG. 5B) provides a data packet 500*b* that the node device 204 may then forward to the node device 212 via the ECMP link 220*b*.

The method 400 then proceeds to block 406 where the third node stores the second node ECMP feedback tag information and sends the packet through a third node link to a fourth node. In an embodiment, at block 406, the ECMP routing and feedback engine 304 in the node device 212/300 receives the data packet 500*b* from the node device 204 and stores the ECMP feedback tag information included therein in its ECMP routing and feedback database(s) 306 such as, for example, in the ECMP feedback table discussed above. As such, in the example provided in FIG. 5B, the ECMP routing and feedback engine 304 in the node device 212/300 may store "N204/E220/L220*b*" in its ECMP feedback table (e.g., associated with the UDI for the port.)

Figure 5C:
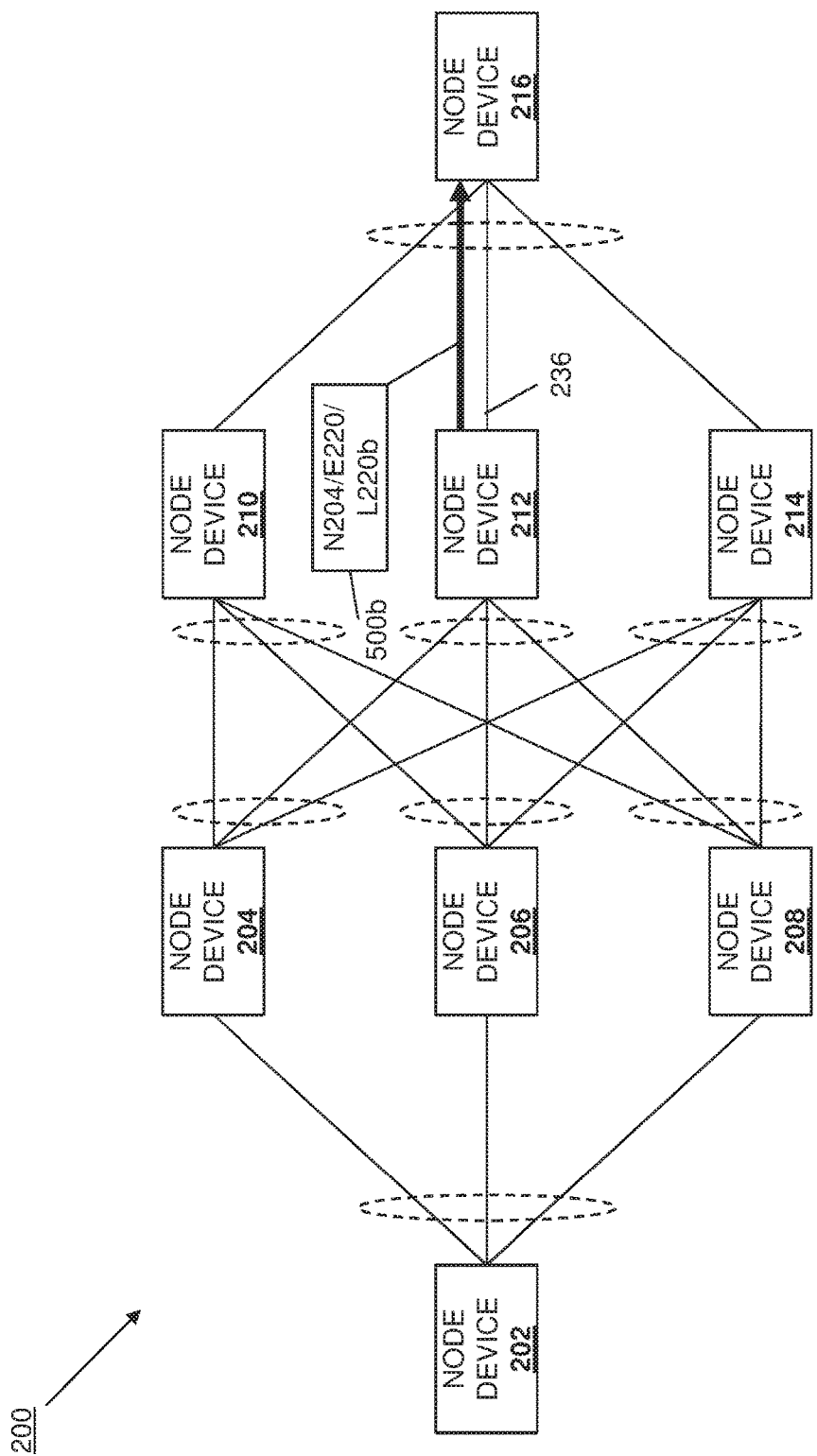
FIG. 5C is a schematic view illustrating an embodiment of the routing of a packet through the network of FIG. 2.
Figure 5D:
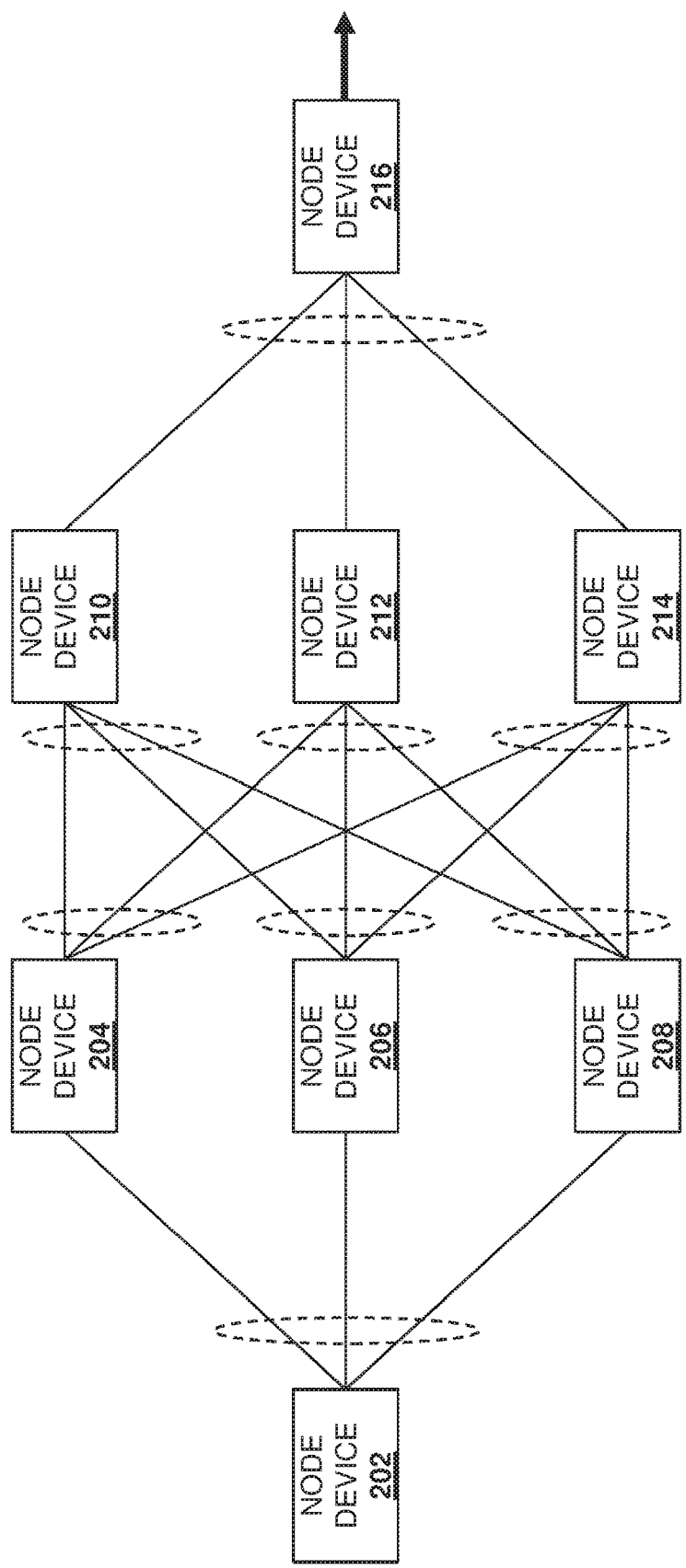
FIG. 5D is a schematic view illustrating an embodiment of the routing of a packet through the network of FIG. 2.

Furthermore, with reference to FIG. 5C, the ECMP routing and feedback engine 304 in the node device 212/300 may determine that the data packet received at block 406 should be forwarded to the node device 216 via the non-ECMP link 236 using a variety of conventional ECMP packet routing techniques that would be apparent to one of skill in the art in possession of the present disclosure. Because the egress link (link 236) is a non-ECMP link, the ECMP routing and feedback engine 304 in the node device 212/300 forwards the data packet 500*b* that includes the ECMP feedback tag information that was received with that data packet ("N204/E220/L220*a*") to the node device 216 via the non-ECMP link 236. As illustrated in FIG. 5D, the node device 216 may then forward the data packet to a destination device (or another network node device).

Thus, as explained above for blocks 402, 404, and 406 of the method 400, the node devices in the network 200 may receive data packets, store ECMP feedback tag information included in those data packets (if any), add an ECMP feedback tag an ECMP feedback tag information to any data packets that are to be forwarded on an ECMP link and that were not received with an ECMP feedback tag, replace ECMP feedback tag information in any data packets that are to be forwarded on an ECMP link and that were received with an ECMP feedback tag having ECMP feedback tab information, and forward data packets with the ECMP information they were received with if those data packets are being forwarded over a non-ECMP link. As such, the forwarding of data packets through the network by the node devices in the network 200 causes each of those node devices to populate the ECMP feedback table discussed above with ECMP feedback tag information received from data packets in the manner described above. One of skill in the art in possession of the present disclosure will recognize that the node devices in the network 200 may perform ECMP feedback tag removal based on, for example, user port configuration in node device ports that connect to a device or other network that does not support the functionality of the present disclosure.

The method 400 then proceeds to decision block 408 where it is determined whether a node link utilization has crossed any thresholds. In an embodiment, at decision block 408, the ECMP routing and feedback engine 304 in each of the node devices in the network 200 may monitor the egress link(s) from that node device to determine whether the utilization of any of those link(s) has crossed a threshold.

The determination of node link utilization by the ECMP routing and feedback engine 304 may be performed via periodically polling the port statistics via software, sending hardware interrupts when port utilization crosses a threshold, and/or any of a variety of other link utilization determination techniques that would be apparent to one of skill in the art in possession of the present disclosure.

In the examples discussed below, node link utilization is categorized by colors that define global link utilization states in the network. For example, link utilization less than a first percentage of the maximum bandwidth of a link (e.g., from 0-50%) may be categorized as a "GREEN" utilization state, link utilization less than a second percentage of the maximum bandwidth of a link but greater than the first percentage of the maximum bandwidth of a link (e.g., from 50-80%) may be categorized as a "YELLOW" utilization state, link utilization less than a third percentage of the maximum bandwidth of a link but greater than the second percentage of the maximum bandwidth of a link (e.g., from 80-100%) may be categorized as a "RED" utilization state, while link failures may be categorized as a "BLACK" utilization state. However, one of skill in the art in possession of the present disclosure will recognize that link utilization may be categorized in a variety of manners that will fall within the scope of the present disclosure as well.

If, at decision block 408, it is determined that a node link utilization has not crossed a threshold, the method 400 continues to loop back through decision block 408 such that the utilization of links provided by a node device are tracked to determine whether they cross the threshold(s). As such, if the ECMP routing and feedback engine 304 in any node device determines that the utilization of its link(s) has not crossed any thresholds (e.g., the link utilization for its link(s) has remained in the "GREEN" utilization state discussed above), that ECMP routing and feedback engine 304 may continue to monitor each of its egress links at decision block 408 to determine whether their utilization crosses a threshold. Furthermore, the monitoring/tracking of the utilization of egress links by the ECMP routing and feedback engine 304 in any of the node devices may include that ECMP routing and feedback engine 304 updating the utilization statistics in its Unique Destination Identifier (UDI) table and its egress entity/UDI mapping table, discussed above, as well as the utilization states in its ECMP feedback table, discussed above.

Figure 6A:
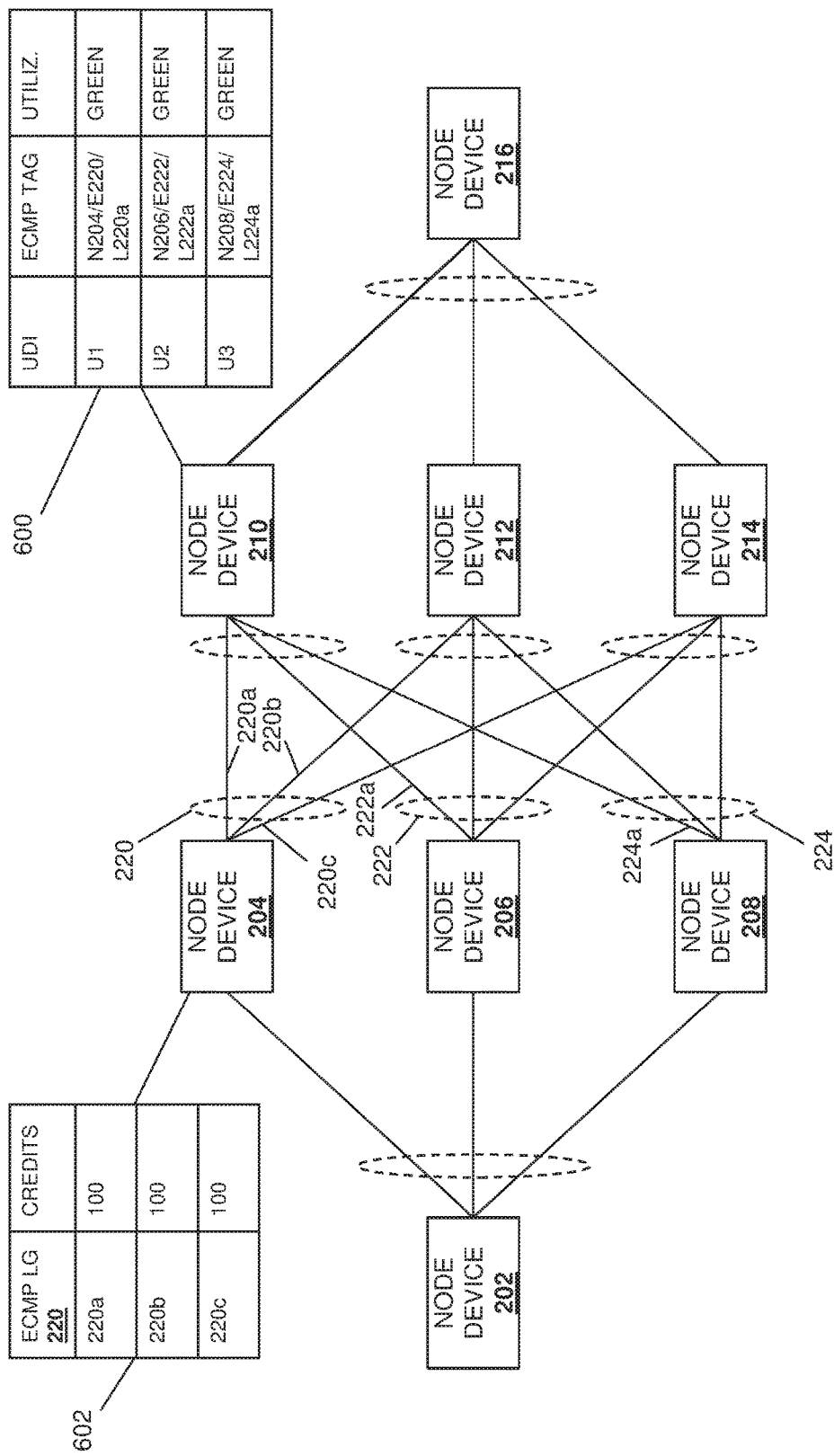
FIG. 6A is a schematic view illustrating an embodiment of an initial state of the network of FIG. 2.

With reference to FIG. 6A, the network 200 is illustrated, with an example of the ECMP feedback table 600 for the node device 210 (showing that the utilization of the egress link (i.e., the non-ECMP link 234) for the ECMP links from each of the node devices 204, 206, and 208 (i.e., the ECMP links 220*a*, 220*b*, and 220*c*, respectively) is in the "GREEN" utilization state. Furthermore, FIG. 6A illustrates an ECMP parameters table 602 for each of the ECMP links 220*a*, 220*b*, and 220*c* in the ECMP link group 220 for the node device 204, which in the illustrated embodiments includes credits associated with those ECMP links. For example, each of the ECMP links 220*a*, 220*b*, and 220*c* is associated with 100 credits, which one of skill in the art in possession of the present disclosure will recognize indicates that each ECMP link is an equally optimal choice for forwarding a data packet according to conventional ECMP packet routing strategies.

If, at decision block 408, it is determined that a node link utilization has crossed a threshold, the node device that detected its node link utilization has crossed a threshold proceeds to the further blocks of method 400. As such, if the ECMP routing and feedback engine 304 in any of the node devices in the network 200 determines that the utilization of one of its egress links has exceeded a threshold (e.g., moved between the "GREEN" utilization state and the "YELLOW" utilization state, moved between the "GREEN" or "YELLOW" utilization state and the "RED" utilization state, or moved to the "BLACK" utilization state), it may generate and transmit the feedback packet as discussed below.

Figure 6B:
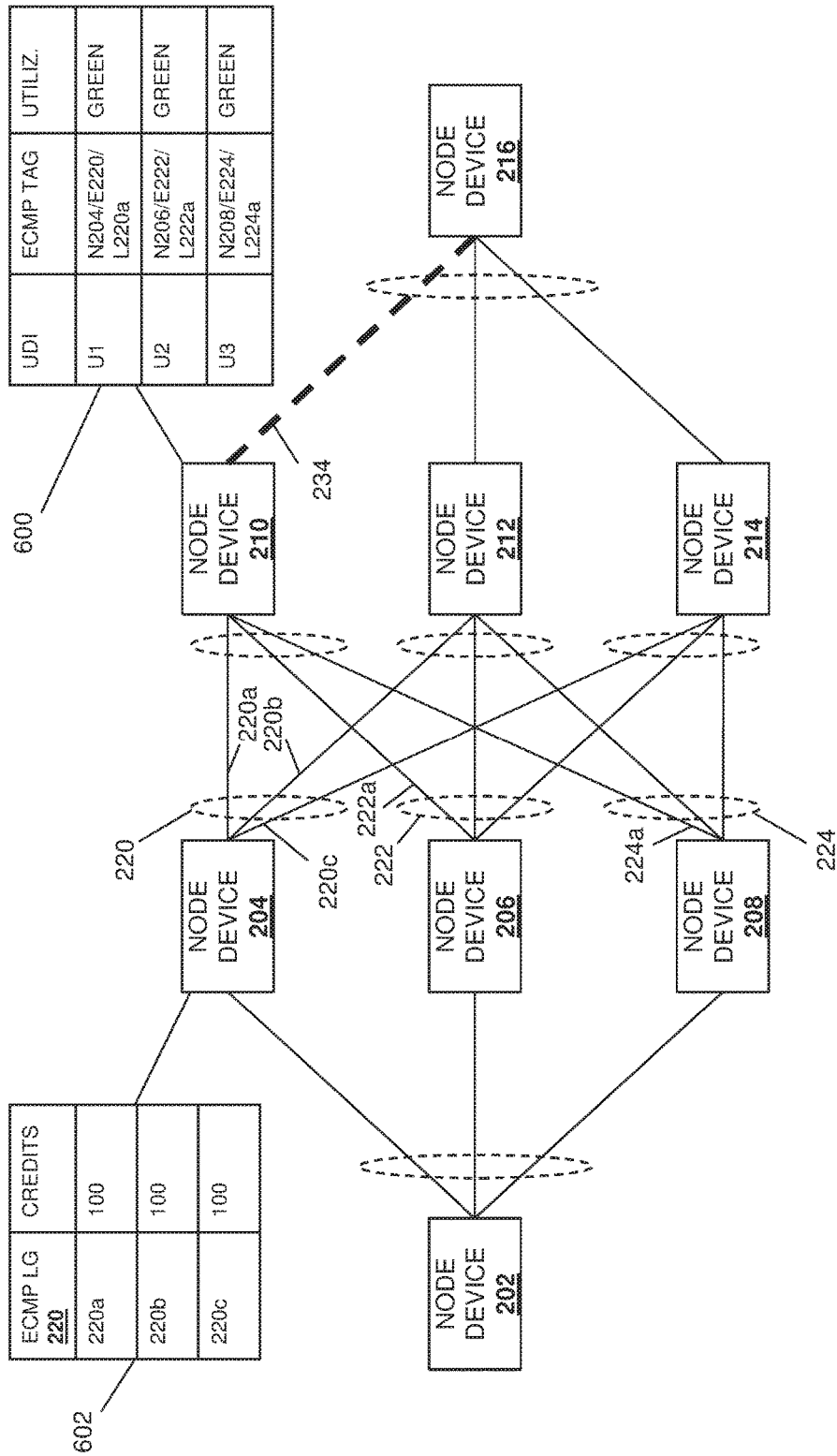
FIG. 6B is a schematic view illustrating an embodiment of increased utilization of a link in the network of FIG. 6A.

For example, at decision block 408, the third node may determine that the third node link utilization has crossed a threshold, and the method 400 proceeds to block 410 where the third node uses the second node ECMP feedback tag information to generate a feedback packet. With reference to FIG. 6B, in an embodiment of block 410, the non-ECMP link 234 provided from the node device 210 to the node device 216 may experience a link utilization that exceeds 50% of the maximum bandwidth of the non-ECMP link 234 (as illustrated by the bolded, dashed line in FIG. 6B.) The increase in the utilization of the non-ECMP link 234 past a threshold (e.g., from the "GREEN" utilization state to the "YELLOW" utilization state, as recorded in the ECMP feedback table 600 for the node device 210 illustrated in FIG. 6C) may be detected by the ECMP routing and feedback engine 304 in the node device 210/300 and, in response, that ECMP routing and feedback engine 304 may operate to generate a feedback packet for each ECMP link from which a data packet has been received. In an embodiment, the feedback packet(s) may be generated at block 410 using any of the ECMP feedback tag information that has been stored by the node device 210 for its egress link.

For example, feedback packet information provided in a feedback packet generated for a particular ECMP link by the ECMP routing and feedback engine 304 in the node device 210/300 may include a source node address that includes the IP address of the node device 210, a destination node address that includes the IP address of the node device that sent that ECMP link, an ECMP link group identifier for the ECMP link group that includes that ECMP link, an ECMP link identifier for that ECMP link, and a utilization state for the egress link on the node device that has had its utilization cross a threshold (e.g., the non-ECMP link 234 that has it's utilization state change from "GREEN" to "YELLOW" in the example below). As such, in the example illustrated in FIGS. 6B and 6C, feedback packets may be generated by the ECMP routing and feedback engine 304 in the node device 210/300 for ECMP links 220a, 220b, and 220c identified in the following table with the corresponding source IP, destination IP, ECMP link group ID, ECMP link ID, and utilization state in its row:

| ECMP LINK | SOURCE IP | DESTINATION IP | ECMP LINK GROUP ID | ECMP LINK ID | UTILIZATION STATE |
|---|---|---|---|---|---|
| FEEDBACK PACKET 1 220a | $IP_{210}$ | $IP_{204}$ | E220 | L220a | YELLOW |
| FEEDBACK PACKET 2 222a | $IP_{210}$ | $IP_{206}$ | E222 | L222a | YELLOW |
| FEEDBACK PACKET 3 224a | $IP_{210}$ | $P_{208}$ | E224 | L224a | YELLOW |

With regard to "feedback packet 1" in the table above, data packets sent from the node device 204 to the node device 210 via the ECMP link 220a include ECMP feedback tag information "N204/E220/L220a", and one of skill in the art will recognize that the ECMP routing and feedback engine 304 in the node device 210/300 may monitor the use of egress link(s) for data packets that include that ECMP feedback tag information in the ECMP feedback table discussed above. When the utilization of the egress link(s) crosses a threshold, the ECMP routing and feedback engine 304 may use the node identifier in that ECMP feedback tag information ("N204") to access the node-to-address table discussed above, retrieve the IP address for the node device 204 ("$IP_{204}$"), and provide that IP address in the feedback packet 1. In addition, the ECMP routing and feedback engine 304 may also retrieve the ECMP link group identifier ("E220") and the ECMP link identifier ("L220a"), and provide those in the feedback packet 1 as well. Finally, the ECMP routing and feedback engine 304 may retrieve the utilization state associated with that ECMP feedback tag information from the ECMP feedback table, and provide that utilization state in the feedback packet 1 as well. One of skill in the art in possession of the present disclosure will recognize how the "feedback packet 2" for ECMP link 222a and the feedback packet 3 for ECMP link 224a may be generated in a similar manner.

The method 400 then proceeds to block 412 where the third node sends the feedback packet through the second node ECMP link to the second node. In an embodiment, at block 412, the ECMP routing and feedback engine 304 in the node device 210/300 may then send each of the feedback packets that were generated at block 410 to the respective node devices that includes the ECMP links for which those feedback packets were generated. For example, as illustrated in FIG. 6C, the ECMP routing and feedback engine 304 in the node device 210/300 sends a feedback packet (e.g., feedback packet 1 in the table above) to the node device 204 that includes the ECMP link 220a, sends a feedback packet (e.g., feedback packet 2 in the table above) to the node device 206 that includes the ECMP link 222a, and sends a feedback packet (e.g., feedback packet 3 in the table above) to the node device 208 that includes the ECMP link 224a.

The method 400 then proceeds to block 414 where the second node adjusts second node ECMP routing parameters based on the feedback packet. In an embodiment, at block 414, the ECMP routing and feedback engine 304 in a node device receiving a feedback packet may utilize the feedback packet information in that feedback packet to adjust ECMP parameters in that node device. For example, with reference to FIG. 6C, the ECMP parameter table 602 for the node device 204 illustrates how credits associated with the ECMP link 220a in the ECMP link group 220 may be reduced (e.g., from "100" to "95" in the illustrated example) in response to receiving the feedback packet (e.g., feedback packet 1 in the table above) that indicates that the utilization of the non-ECMP link 234 (through which data packets sent on the ECMP link 220a are forwarded by the node device 210) has crossed a threshold (e.g., from the "GREEN" utilization state to the "YELLOW" utilization state in this example). One of skill in the art in possession of the present disclosure will recognize that ECMP parameters in each of the node devices 206 and 208 may be adjusted in a similar manner in response to receiving their respective feedback packets (e.g., feedback packet 2 and feedback packet 3, respectively, in the table above.) One of skill in the art in possession of the present disclosure will recognize how the adjustment of the ECMP parameters (e.g., the reduction of credits in the example above) may cause the node device 204 to send packets that are part of a new flow over the ECMP links 220b and/or 220c rather than ECMP link 220a, or redirect packets that are part of an existing flow over the ECMP links 220b and/or 220c in place of ECMP link 220a.

The method 400 may then return to decision block 408 to track node link utilizations to determine whether they have crossed a threshold and, if so, loop back through blocks 410, 412, and 414. For example, FIGS. 6D and 6E illustrate how, following the network in the state illustrated in FIG. 6C, the utilization of the non-ECMP link 234 may increase such that it crosses another threshold (e.g., from the "YELLOW" utilization state to the "RED" utilization state, as illustrated in by the bolded dotted/dashed link in FIG. 6D, and recorded in the ECMP feedback table 600 for the node device 210 illustrated in FIG. 6E). As illustrated in FIG. 6E, the node device 210 may generate feedback packets that are substantially similar to the feedback packets described above but that identify the increased utilization, and send those feedback packets to the node devices 204, 206, and 208 in substantially the same manner as discussed above. In response to receiving the feedback packet that indicates that the utilization of the non-ECMP link 234 (through which data packets sent on the ECMP link 220a are forwarded by the node device 210) has crossed a threshold (e.g., from the "YELLOW" utilization state to the "RED" utilization state in this example), the credits associated with the ECMP link 220a in the ECMP link group 220 may be reduced (e.g., from "95" to "10" in the illustrated example).

Figure 6C:
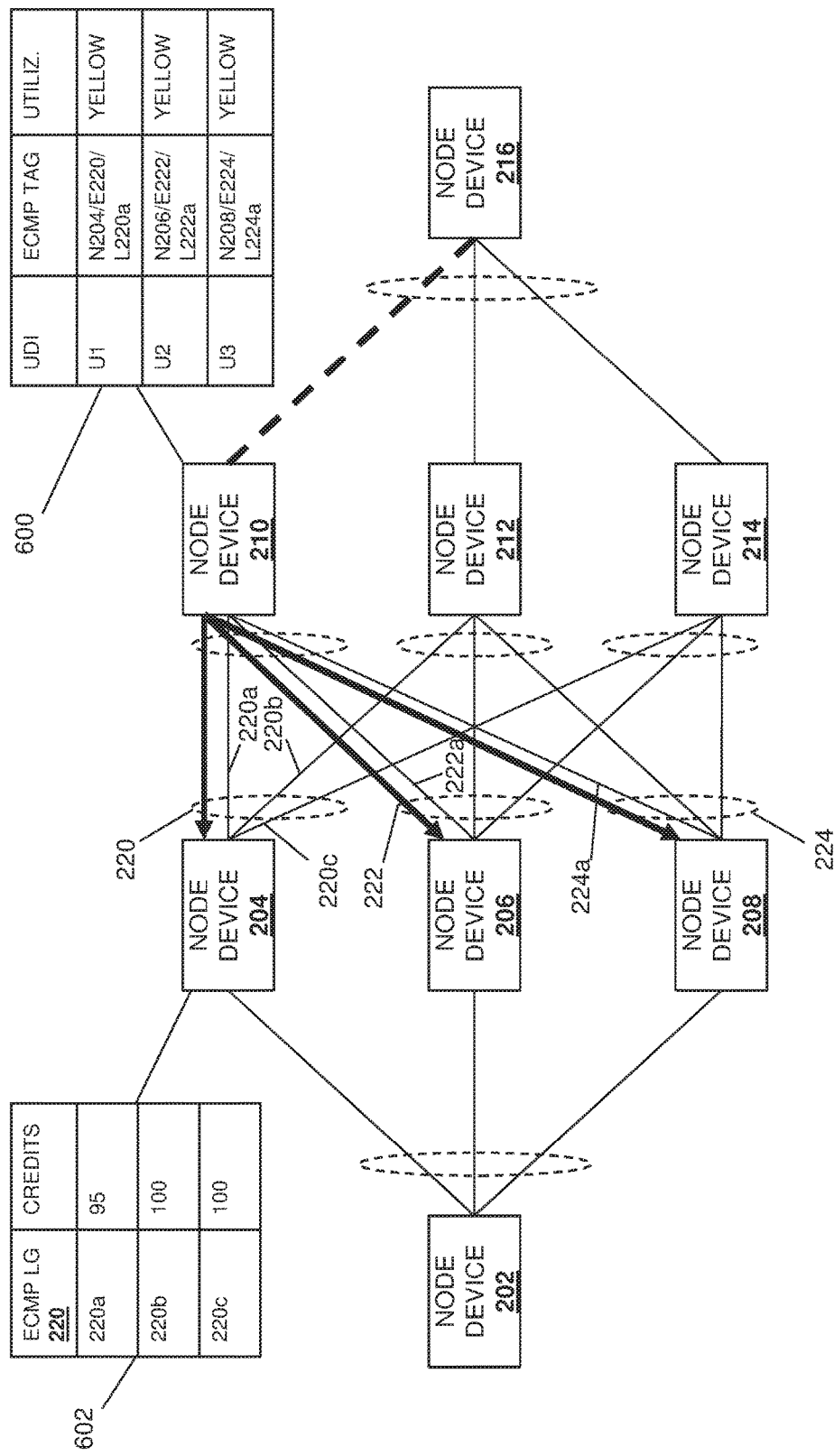
FIG. 6C is a schematic view illustrating an embodiment of feedback packets sent based on the increased utilization of a link in the network illustrated in FIG. 6B.
Figure 6D:
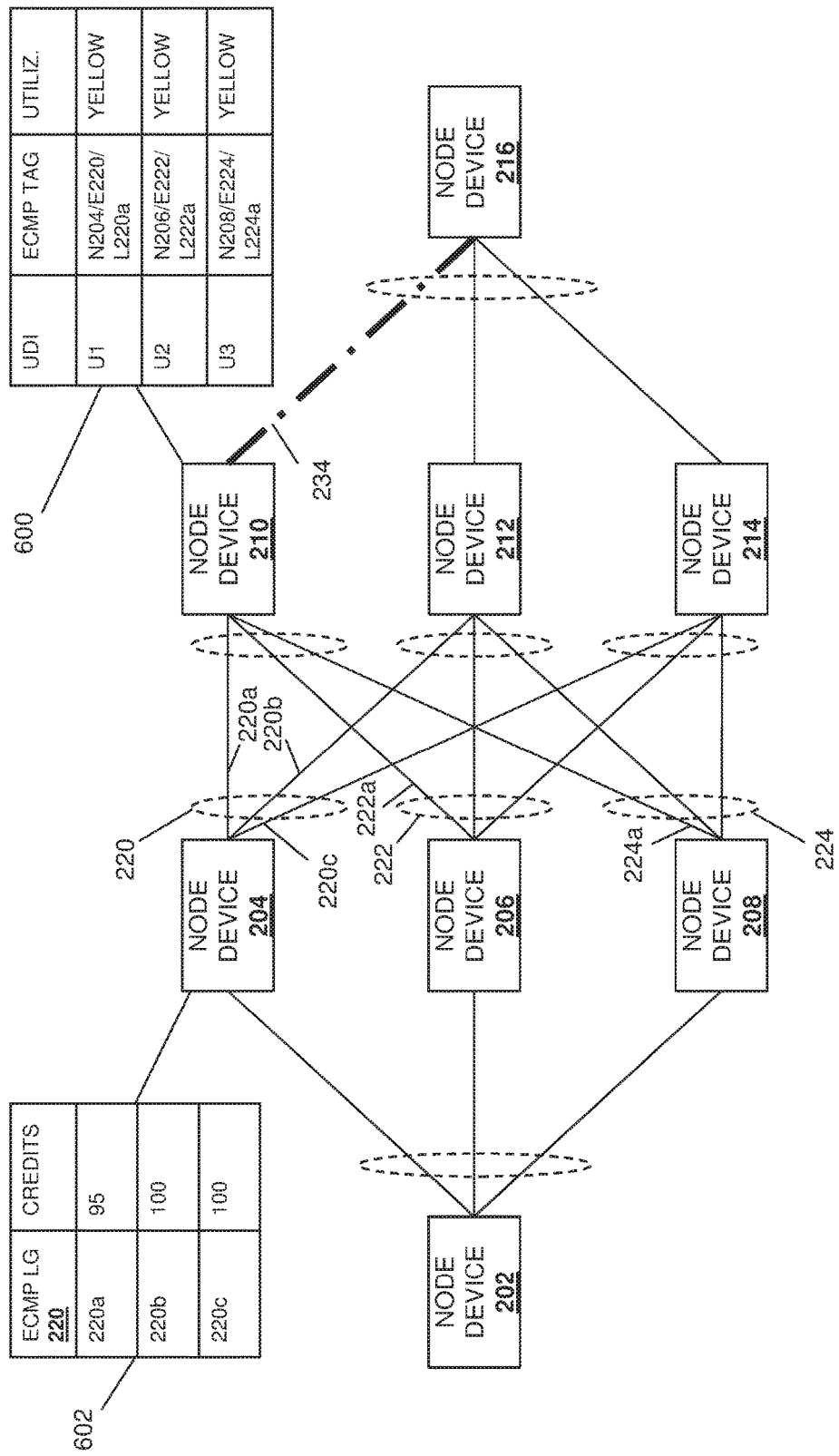
FIG. 6D is a schematic view illustrating an embodiment of increased utilization of a link in the network of FIG. 6B.
Figure 6E:
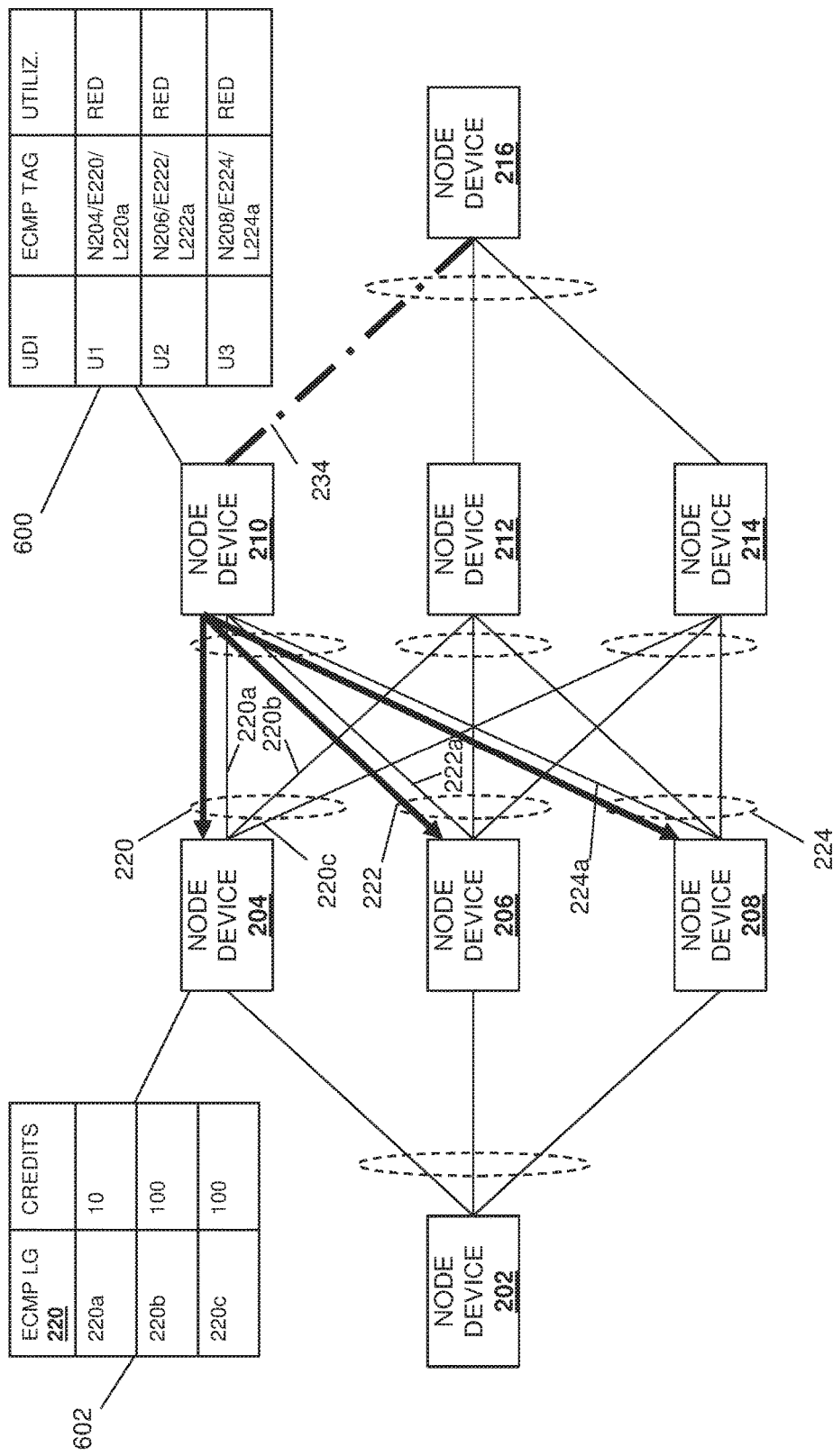
FIG. 6E is a schematic view illustrating an embodiment of feedback packets sent based on the increased utilization of a link in the network illustrated in FIG. 6D.
Figure 6F:
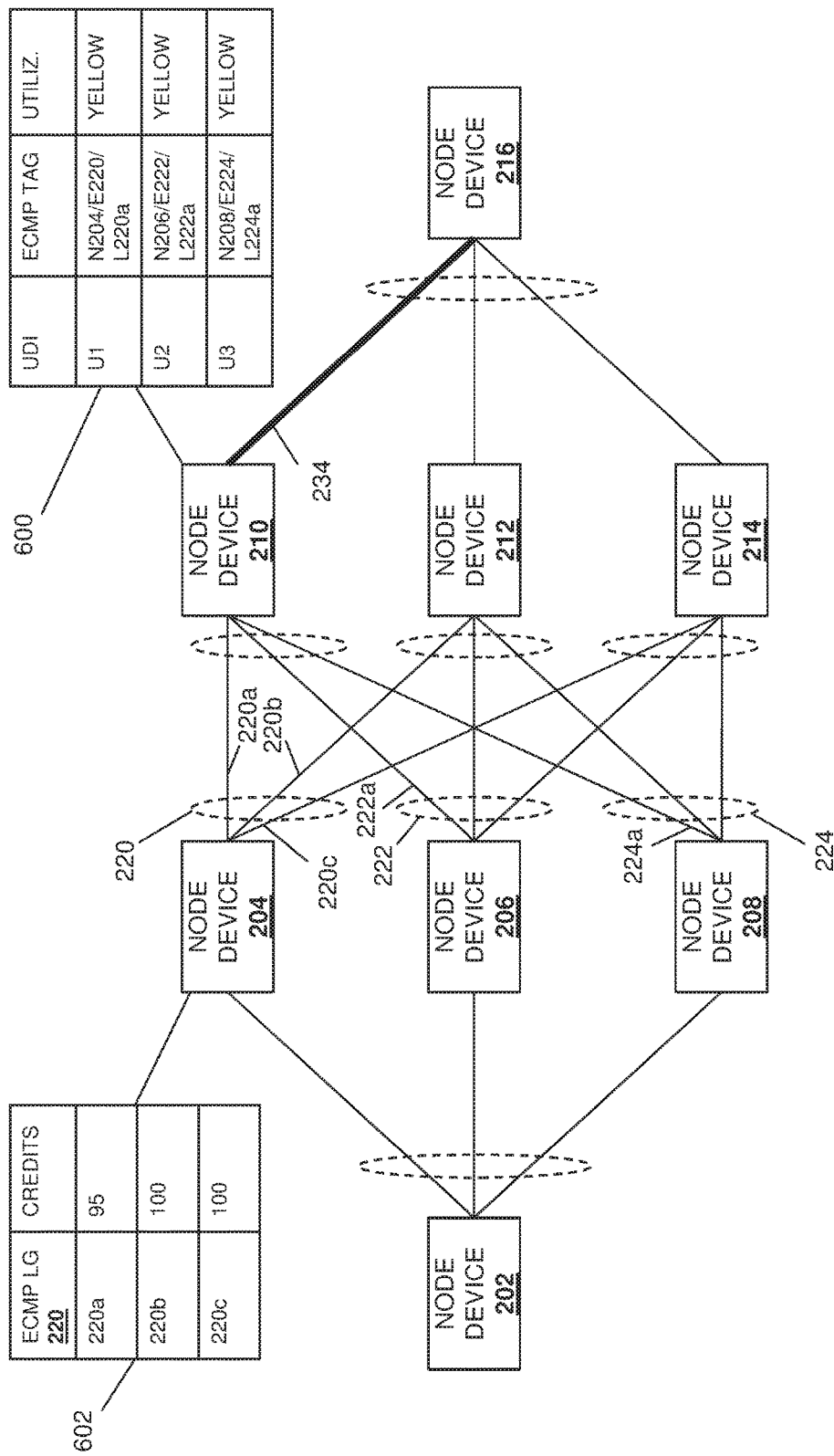
FIG. 6F is a schematic view illustrating an embodiment of decreased utilization of a link in the network of FIG. 6B.
Figure 6G:
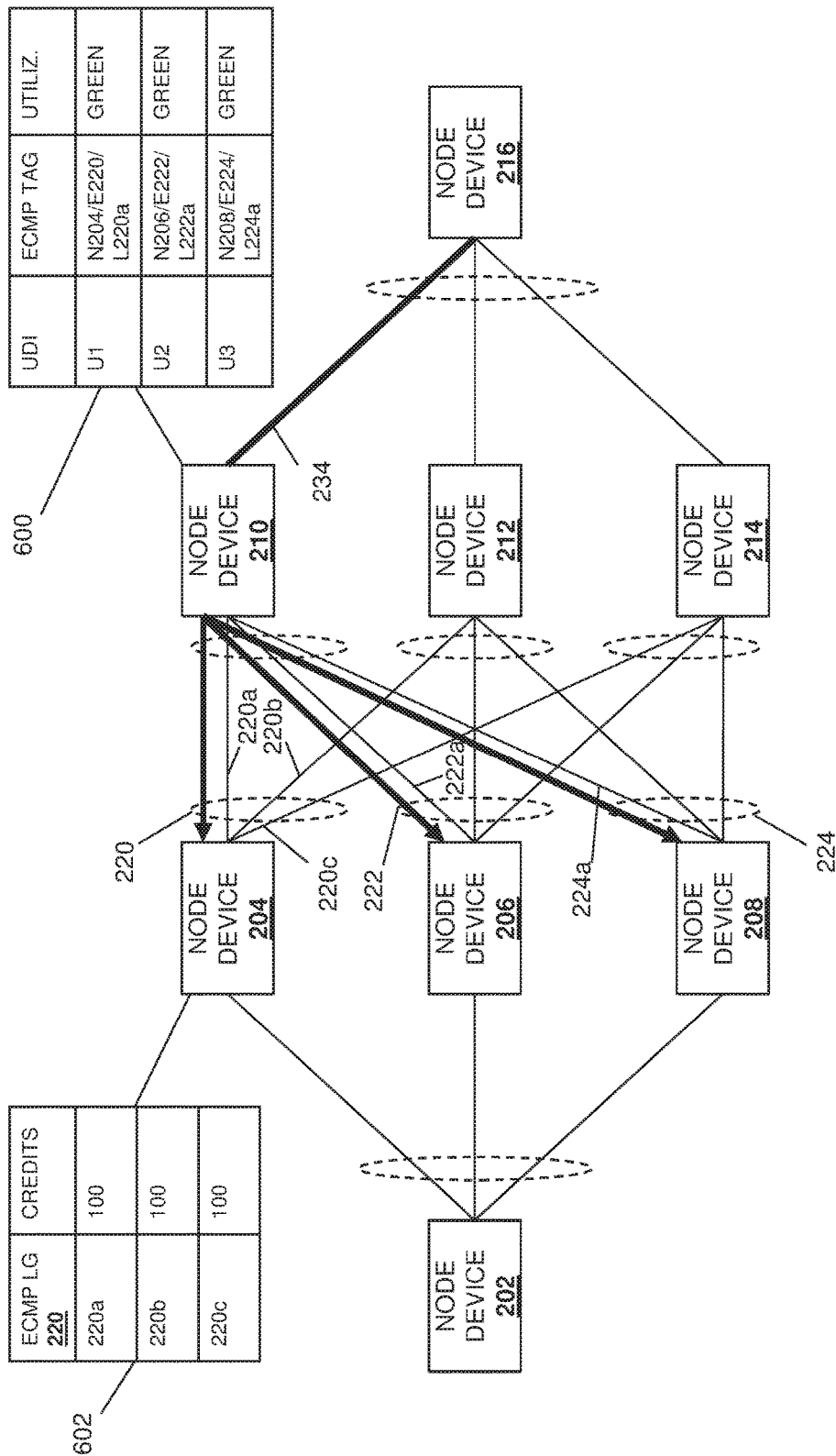
FIG. 6G is a schematic view illustrating an embodiment of feedback packets sent based on the decreased utilization of a link in the network illustrated in FIG. 6F.

In another example, FIGS. 6F and 6G illustrate how, following the network in the state illustrated in FIG. 6C, the utilization of the non-ECMP link 234 may decrease such that it crosses another threshold (e.g., from the "YELLOW" utilization state to the "GREEN" utilization state, as illustrated in by the bolded link in FIG. 6G, and recorded in the ECMP feedback table 600 for the node device 210 illustrated in FIG. 6G). As illustrated in FIG. 6G, the node device 210 may generate feedback packets that are substantially similar to the feedback packets described above but that identify the decreased utilization, and send those feedback packets to the node devices 204, 206, and 208 in substantially the same manner as discussed above. In response to receiving the feedback packet that indicates that the utilization of the non-ECMP link 234 (through which data packets sent on the ECMP link 220a are forwarded by the node device 210) has crossed a threshold (e.g., from the "YELLOW" utilization state to the "GREEN" utilization state in this example), the credits associated with the ECMP link 220a in the ECMP link group 220 may be increased (e.g., from "95" to "100" in the illustrated example).

Figure 6H:
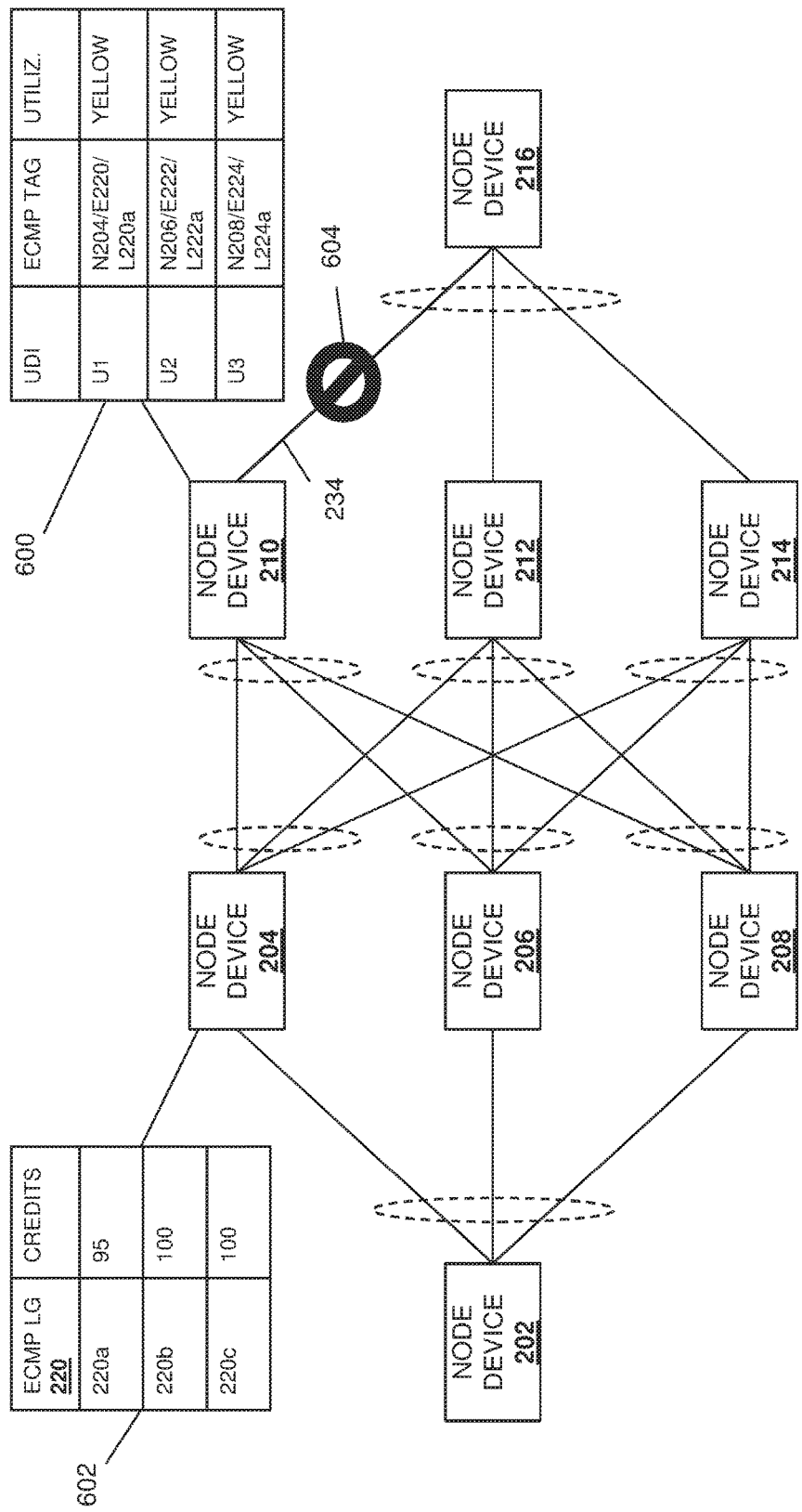
FIG. 6H is a schematic view illustrating an embodiment of the link in the network of FIG. 6B becoming unavailable.
Figure 6I:
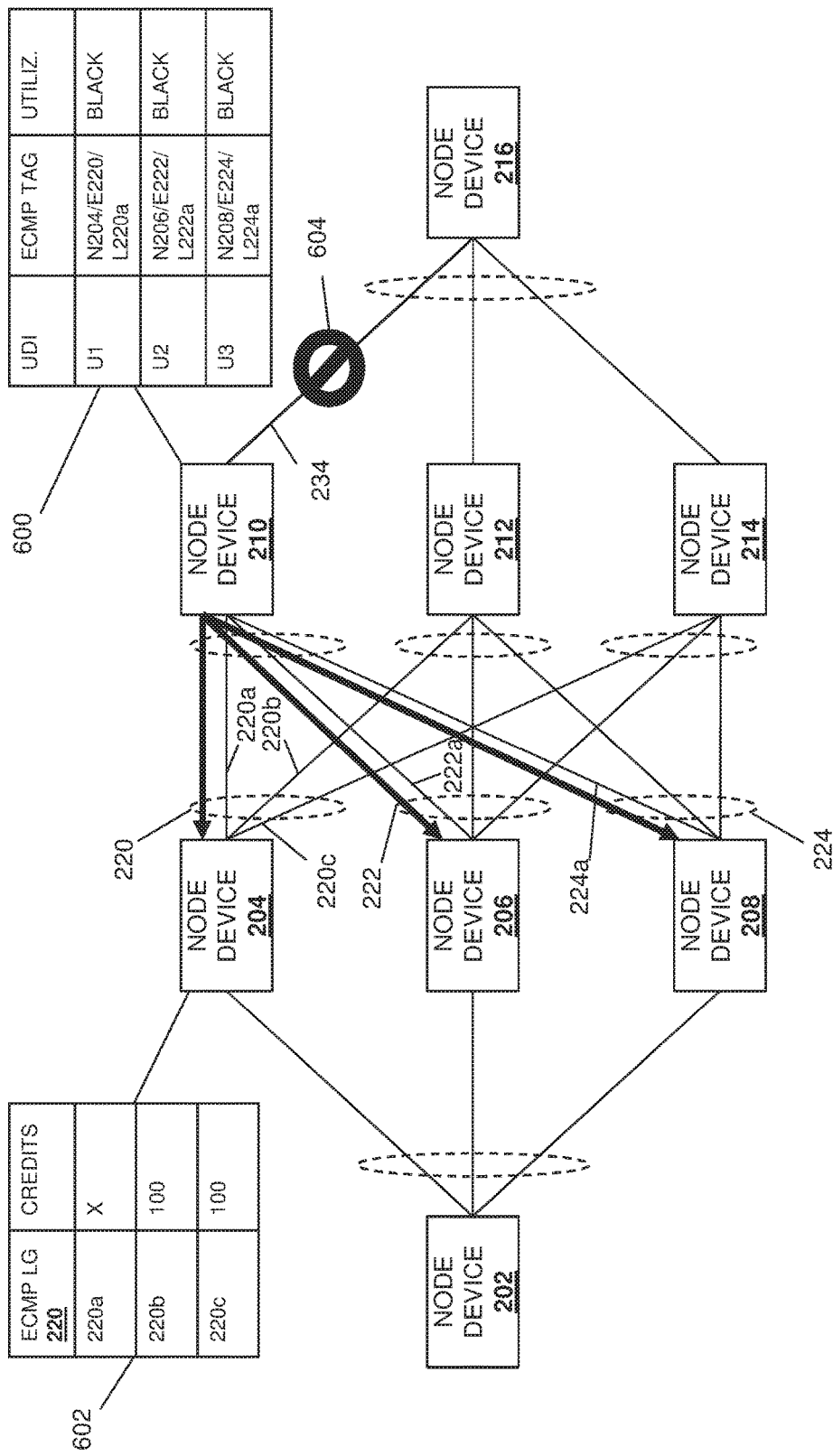
FIG. 6I is a schematic view illustrating an embodiment of feedback packets sent based on the unavailable link in the network illustrated in FIG. 6H.

In another example, FIGS. 6H and 6I illustrate how, following the network in the state illustrated in FIG. 6C, the non-ECMP link 234 may become unavailable (e.g., as illustrated by the element 604 in FIG. 6I, and recorded in the ECMP feedback table 600 for the node device 210 illustrated in FIG. 6I). As illustrated in FIG. 6I, the node device 210 may generate feedback packets that are substantially similar to the feedback packets described above but that identify the unavailable link, and send those feedback packets to the node devices 204, 206, and 208 in substantially the same manner as discussed above. In response to receiving the feedback packet that indicates that the non-ECMP link 234 (through which data packets sent on the ECMP link 220a are forwarded by the node device 210) is unavailable (e.g., a "BLACK" utilization state), the ECMP link 220a in the ECMP link group 220 may be disabled.

While the above examples focus on the adjustments of ECMP parameters (e.g., credits) used to determine whether to forward packets over an ECMP link, ECMP parameters may be adjusted for ECMP link groups (or Link Aggregation Groups (LAGs)) using the teachings of the present disclosure as well. For example, decision block 408 of the method 400 may be utilized for tracking node link group utilizations to determine whether they have crossed a threshold and, if so, loop through blocks 410, 412, and 414 to provide feedback packets that result in the adjustment of ECMP parameters for ECMP link groups (or LAGs).

Figure 7A:
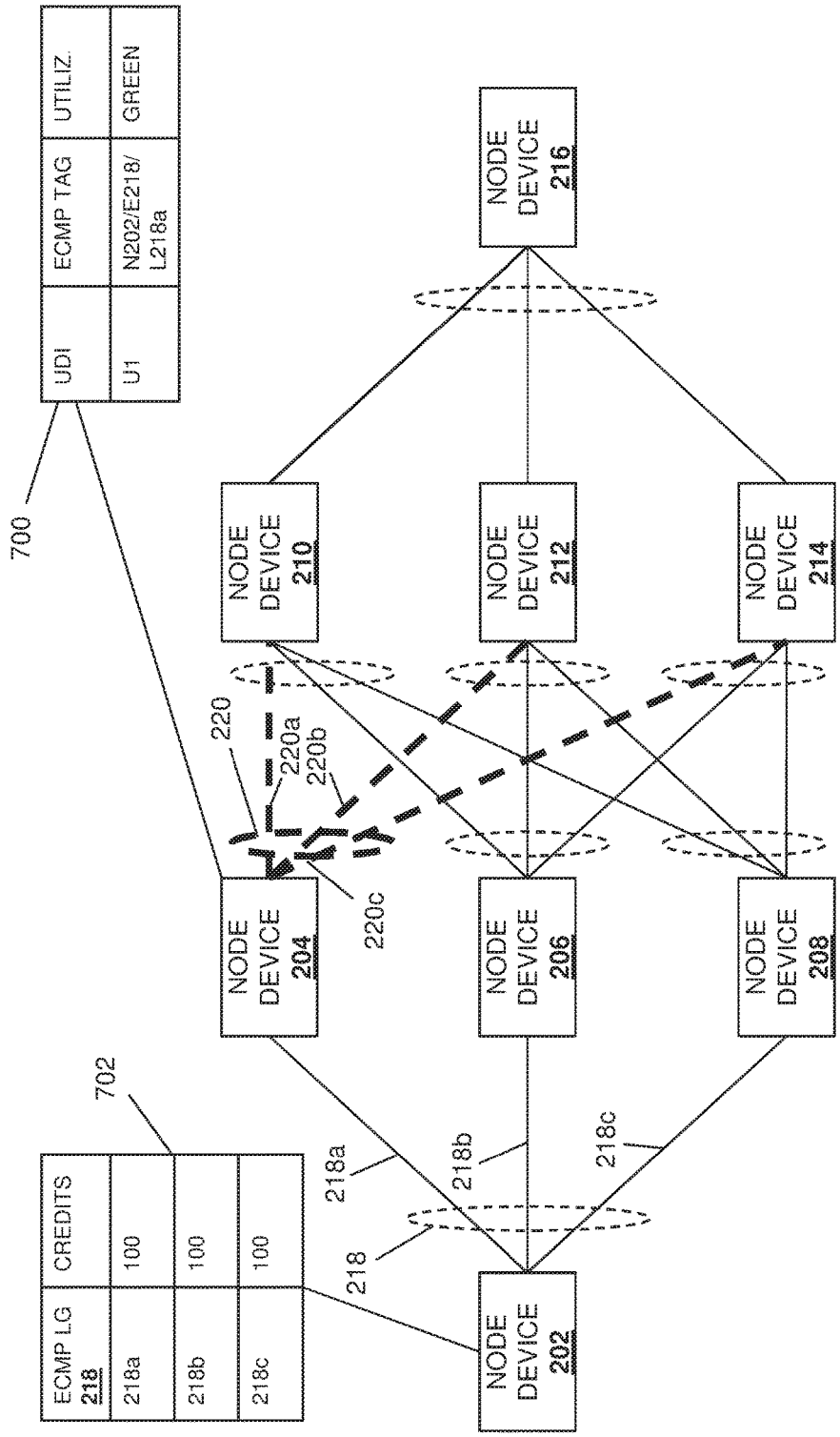
FIG. 7A is a schematic view illustrating an embodiment of an increased utilization of a link group in the network of FIG. 6A.
Figure 7B:
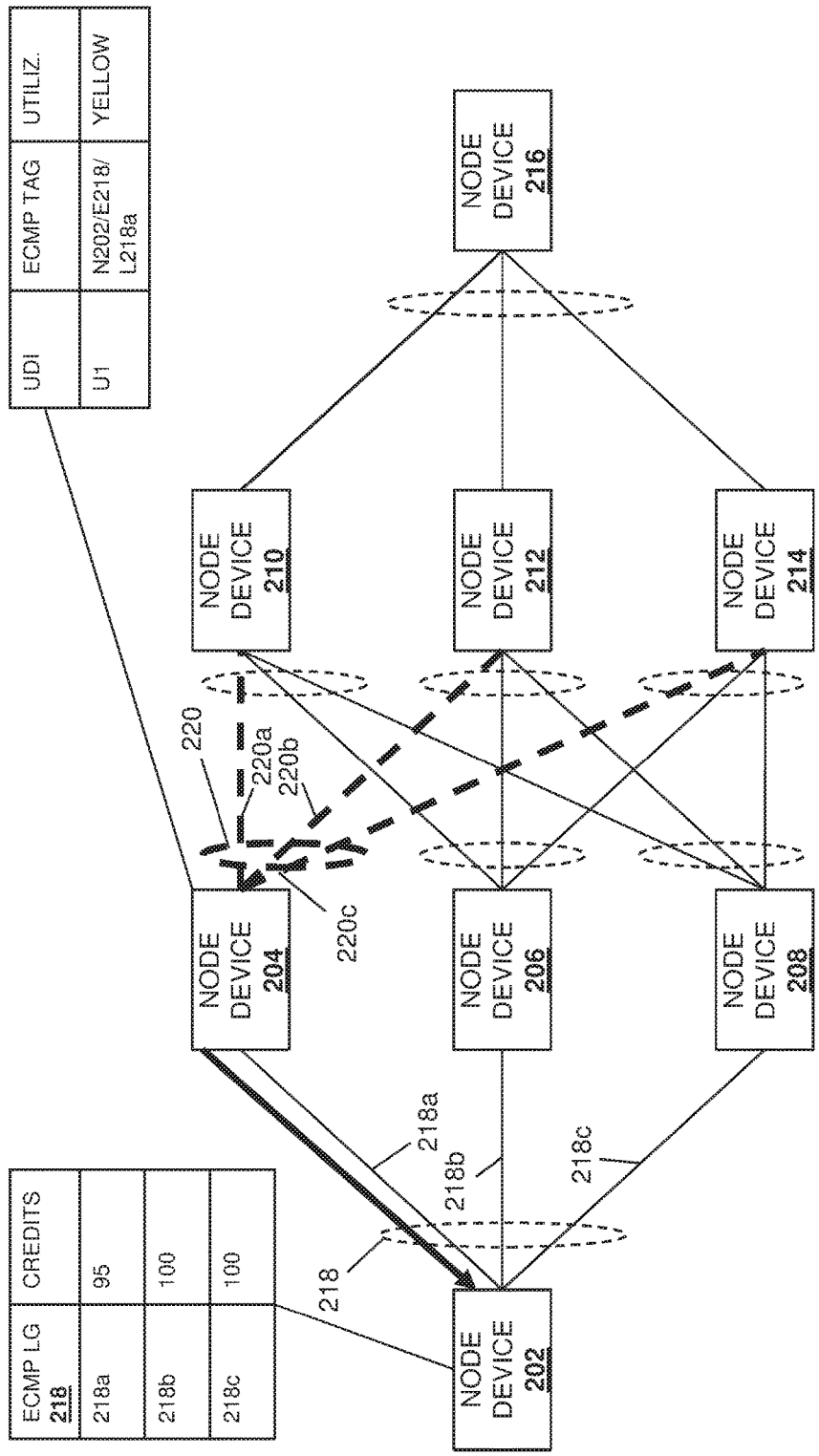
FIG. 7B is a schematic view illustrating an embodiment of a feedback packet sent based on the increased utilization of the link group in the network illustrated in FIG. 7A.

With reference to FIG. 7A, an ECMP feedback table 700 for the node device 204 is used to track the utilization of the ECMP link group 220, while an ECMP parameter table 702 for the node device 202 is illustrated prior to receiving any feedback packets. Following the network 200 in a state in which the ECMP link group was in a "GREEN" utilization state (as recorded in the ECMP feedback table 700 illustrated in FIG. 7A, the utilization of the ECMP link group 220 may increase such that it crosses a threshold (e.g., from the "GREEN" utilization state to the "YELLOW" utilization state, as illustrated in by the bolded dasged link group and link in FIG. 7A, and as recorded in the ECMP feedback table 700 for the node device 204 in FIG. 7B). As illustrated in FIG. 7B, the node device 204 may generate a feedback packet that is substantially similar to the feedback packets described above but that identify the increased utilization of the ECMP link group 220, and send that feedback packet to the node device 202 in substantially the same manner as discussed above. In response to receiving the feedback packet that indicates that the utilization of the ECMP link group 220 (through which data packets sent on the ECMP link 218a are forwarded by the node device 204) has crossed a threshold (e.g., from the "YELLOW" utilization state to the "GREEN" utilization state in this example), the credits associated with the ECMP link 218a in the ECMP link group 218 may be reduced (e.g., from "100" to "95" in the illustrated example).

Thus, systems and methods have been described that provide for packet routing that takes into account an overall path-based feedback mechanism that allows for the selection of an optimal forwarding node for a new packet flow, or the redistribution of existing packet flows in cases of packet traffic imbalances in a network. For example, the data packets routed through the network by nodes may include a feedback tag that allows any node forwarding that data packet to another node to add feedback tag information such as a node identifier for the node forwarding the data packet, a link group identifier for the link group used to forward that data packet, and a link identifier for the link used to forward that data packet. Nodes receiving data packets with feedback tag information will store that feedback tag information, and either replace that feedback tag information with new feedback tag information if the data packet is forward via a participating link, or forward the data packet with the feedback tag information it was received with if the data packet is forwarded via a non-participating link. When any node determines that the utilization of a downstream link has crossed a threshold, it may use feedback tag information to generate a feedback packet and send that feedback packet upstream to nodes that provided that feedback tag information. Nodes receiving feedback packets will adjust their routing parameters based on the feedback packet, which results in improved selection of optimal forwarding nodes for new packet flows or existing packet flows.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A feedback-based Equal Cost Multi-Path (ECMP) packet routing system, comprising:
   a first node that includes a first node ECMP link group having a plurality of first node ECMP links, wherein the first node is configured to:
      provide, in data packets forwarded through any of the plurality of first node ECMP links, first node ECMP feedback tag information that includes:
         a first node identifier that identifies the first node;
         a first node ECMP link group identifier that identifies the first node ECMP link group; and
         a first node ECMP link identifier that identifies the one of the plurality of first node ECMP links through which the data packet is forwarded; and
   a second node that is directly coupled to the first node via one the first node ECMP links, wherein the second node includes a second node link that is coupled to a third node, and wherein the second node is configured to:
      receive a data packet from the first node via one of the first node ECMP links;
      store the first node ECMP feedback tag information that is included in the data packet;
      forward the data packet through the second node link to the third node; and
      determine that a link utilization of the second node link has reached a threshold and, in response, use the ECMP feedback tag information to generate and send a feedback packet through the first node ECMP link to the first node that is configured to cause the first node to adjust ECMP routing parameters in the first node.

2. The system of claim 1, wherein the second node link is a non-ECMP link, and wherein the second node is configured to forward the data packet through the second node link to the third node without changing the first node ECMP feedback tag information.

3. The system of claim 1, wherein the second node link is a second node ECMP link that is part of a second node ECMP link group included on the second node, and wherein the second node is configured to replace, in the data packet forwarded through the second node ECMP link to the third node, the first node ECMP feedback tag information with second node ECMP feedback tag information that includes:
   a second node identifier that identifies the second node;
   a second node ECMP link group identifier that identifies the second node ECMP link group; and
   a second node ECMP link identifier that identifies the second node ECMP link through which the data packet is forwarded.

4. The system of claim 1, wherein the feedback packet includes link utilization information associated with the link utilization of the second node link, and wherein the feedback packet is configured to cause the first node to adjust ECMP routing parameters in the first node based on the link utilization information.

5. The system of claim 1, wherein the second node is configured to generate the feedback packet using the ECMP feedback tag information by:
   retrieving the first node identifier from the first node ECMP feedback tag information that was stored;
   accessing a node-to-address table using the first node identifier to identify an address for the first node; and
   providing the address for the first node as a destination for the feedback packet.

6. The system of claim 1, wherein the second node is configured to:
   track the link utilization of the second node link.

7. An Information Handling System (IHS), comprising:
   a communication system that is configured to provide a communication system link;
   a processing system that is coupled to the communication system; and
   a memory system that is coupled to the processing system and that includes instructions that, when executed by the processing system, cause the processing system to provide an Equal Cost Multi-Path (ECMP) routing and feedback engine that is configured to:
      receive a data packet from a first node via the a first node ECMP link that is part of a first node ECMP link group included on the first node, wherein the data packet includes first node ECMP feedback tag information including:
         a first node identifier that identifies the first node;
         a first node ECMP link group identifier that identifies the first node ECMP link group; and
         a first node ECMP link identifier that identifies the first node ECMP link through which the data packet was forwarded;
      store the first node ECMP feedback tag information that is included in the data packet;
      forward the data packet to a second node through a communication system link provided by the communication system; and
      determine that a link utilization of the communication system link has reached a threshold and, in response, use the ECMP feedback tag information to generate and send a feedback packet through the first node ECMP link to the first node that is configured to cause the first node to adjust ECMP routing parameters in the first node.

8. The IHS of claim 7, wherein the communication system link is a non-ECMP link, and wherein the ECMP routing and feedback engine is configured to forward the data packet through the communication system link to the second node without changing the first node ECMP feedback tag information.

9. The IHS of claim 7, wherein the communication system link is an communication system ECMP link that is part of an communication system ECMP link group provided by the communication system, and wherein the ECMP routing and feedback engine is configured to replace, in the data packet forwarded through the communication system ECMP link to the second node, the first node ECMP feedback tag information with IHS node ECMP feedback tag information that includes:
   an IHS identifier that identifies the IHS;
   a communication system ECMP link group identifier that identifies the communication system ECMP link group; and
   a communication system ECMP link identifier that identifies the communication system ECMP link through which the data packet is forwarded.

10. The IHS of claim 7, wherein the feedback packet includes link utilization information associated with the link utilization of the communication system link, and wherein the feedback packet is configured to cause the first node to adjust ECMP routing parameters in the first node based on the link utilization information.

11. The IHS of claim 7, wherein the ECMP routing and feedback engine is configured to generate the feedback packet using the ECMP feedback tag information by:

retrieving the first node identifier from the first node ECMP feedback tag information that was stored;

accessing a node-to-address table using the first node identifier to identify an address for the first node; and providing the address for the first node as a destination for the feedback packet.

12. The IHS of claim 7, wherein the ECMP routing and feedback engine is configured to:

track the link utilization of the communication system link.

13. The IHS of claim 7, wherein the feedback packet is configured to cause the first node to adjust ECMP routing parameters in the first node by adjusting credits associated with the first node ECMP link.

14. A method for Equal Cost Multi-Path (ECMP) feedback-based routing, comprising:

receiving, by first node, a data packet from a second node via the a second node ECMP link that is part of a second node ECMP link group included on the second node, wherein the data packet includes second node ECMP feedback tag information including:

a second node identifier that identifies the second node;

a second node ECMP link group identifier that identifies the second node ECMP link group; and a second node ECMP link identifier that identifies the second node ECMP link through which the data packet was forwarded;

storing, by the first node, the second node ECMP feedback tag information that is included in the data packet;

forwarding, by the first node through a first node link, the data packet to a third node; and determining, by the first node, that a link utilization of the first node link has reached a threshold and, in response, use the ECMP feedback tag information to generate and send a feedback packet through the second node ECMP link to the second node that is configured to cause the second node to adjust ECMP routing parameters in the second node.

15. The method of claim 14, wherein the first node link is a non-ECMP link, and wherein the first node forwards the data packet through the first node link to the third node without changing the second node ECMP feedback tag information.

16. The method of claim 14, wherein the first node link is a first node ECMP link that is part of a first node ECMP link group included on the first node, and wherein the method further comprises:

replacing, by the first node in the data packet forwarded through the first node ECMP link to the third node, the second node ECMP feedback tag information with first node ECMP feedback tag information that includes:

a first node identifier that identifies the first node;

a first node ECMP link group identifier that identifies the first node ECMP link group; and a first node ECMP link identifier that identifies the first node ECMP link through which the data packet is forwarded.

17. The method of claim 14, wherein the feedback packet includes link utilization information associated with the link utilization of the first node link, and wherein the feedback packet is configured to cause the second node to adjust ECMP routing parameters in the second node based on the link utilization information.

18. The method of claim 14, wherein the generating the feedback packet using the ECMP feedback tag information includes:

retrieving, by the first node, the second node identifier from the second node ECMP feedback tag information that was stored;

accessing, by the first node, a node-to-address table using the second node identifier to identify an address for the second node; and providing, by the first node, the address for the second node as a destination for the feedback packet.

19. The method of claim 14, further comprising:

tracking, by the first node, the link utilization of the first node link.

20. The method of claim 14, wherein the feedback packet is configured to cause the second node to adjust ECMP routing parameters in the second node by adjusting credits associated with the second node ECMP link.

* * * * *